(12) United States Patent
Tanaka et al.

(10) Patent No.: US 11,340,740 B2
(45) Date of Patent: May 24, 2022

(54) ELECTRONIC PEN

(71) Applicant: Wacom Co., Ltd., Saitama (JP)

(72) Inventors: Kohei Tanaka, Tokyo (JP); Kenichi Ninomiya, Kanagawa (JP)

(73) Assignee: Wacom Co., Ltd., Saitama (JP)

( * ) Notice: Subject to any disclaimer, the term of this patent is extended or adjusted under 35 U.S.C. 154(b) by 64 days.

(21) Appl. No.: 16/654,960

(22) Filed: Oct. 16, 2019

(65) Prior Publication Data

US 2020/0050298 A1 Feb. 13, 2020

Related U.S. Application Data

(63) Continuation of application No. PCT/JP2018/011617, filed on Mar. 23, 2018.

(30) Foreign Application Priority Data

Jun. 13, 2017 (JP) .............................. JP2017-116229

(51) Int. Cl.
*G06F 3/044* (2006.01)
*G06F 3/0354* (2013.01)
*G06F 3/046* (2006.01)

(52) U.S. Cl.
CPC ........ *G06F 3/0441* (2019.05); *G06F 3/03545* (2013.01); *G06F 3/046* (2013.01); *G06F 3/0442* (2019.05)

(58) Field of Classification Search
CPC .................................................. G06F 3/03545
See application file for complete search history.

(56) References Cited

U.S. PATENT DOCUMENTS

| 6,204,457 | B1* | 3/2001 | Shekhel | G06F 3/03545 |
| | | | | 178/19.01 |
| 10,025,404 | B2* | 7/2018 | Zimmerman | G06F 3/03545 |
| 2008/0257613 | A1 | 10/2008 | Katsurahira | |
| 2016/0349865 | A1* | 12/2016 | Arai | G06F 3/0383 |

FOREIGN PATENT DOCUMENTS

| JP | 2008-269244 A | 11/2008 |
| JP | 2010-262554 A | 11/2010 |

OTHER PUBLICATIONS

International Search Report, dated May 1, 2018, for International Application No. PCT/JP2018/011617, 1 page.

\* cited by examiner

*Primary Examiner* — Robin J Mishler
(74) *Attorney, Agent, or Firm* — Seed IP Law Group LLP

(57) ABSTRACT

An electronic pen includes a core body including a tip portion having a tip and a tapered side surface tapered toward the tip and having a recessed section recessed toward a tip side of the core body from a side of the core body that is opposite to the tip side of the core body, and including a core rod that passes through a center axis of the recessed section from a side of the tip portion that includes the tip and extends away from the tip; and a tubular casing in which a pen-pressure detector is installed, the core body being attached to the tubular casing in an axially movable manner such that the core rod is pressable against the pen-pressure detector, and the tubular casing having a surface that is adjacent to an inner or outer surface of the recessed section of the core body.

13 Claims, 10 Drawing Sheets

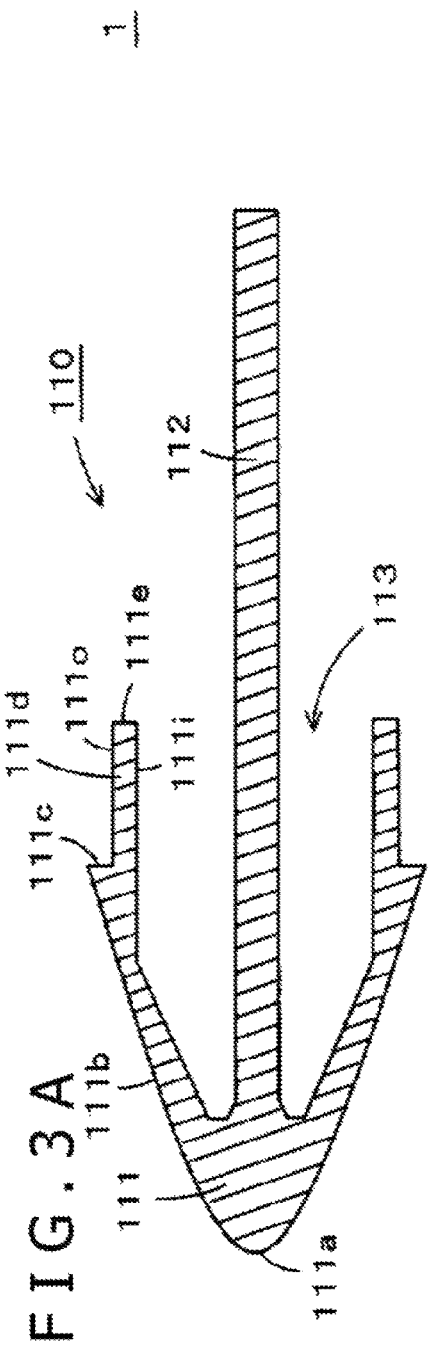
F I G. 3 A
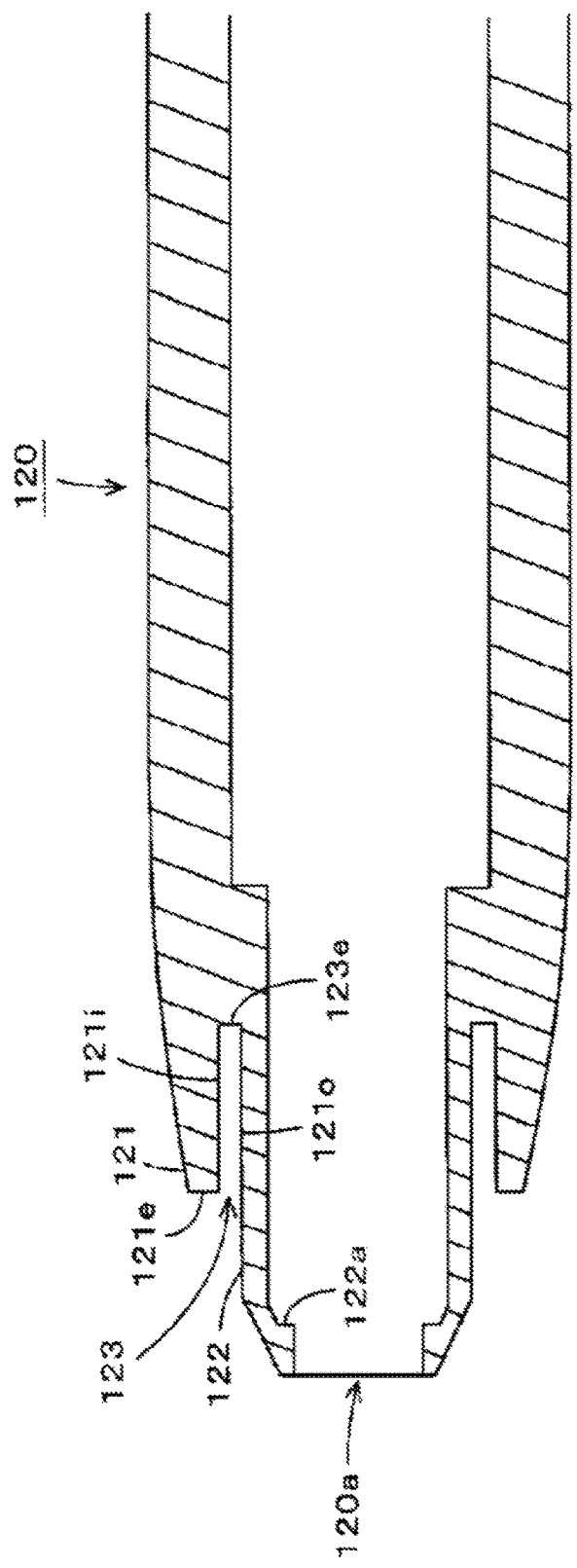
F I G. 3 B

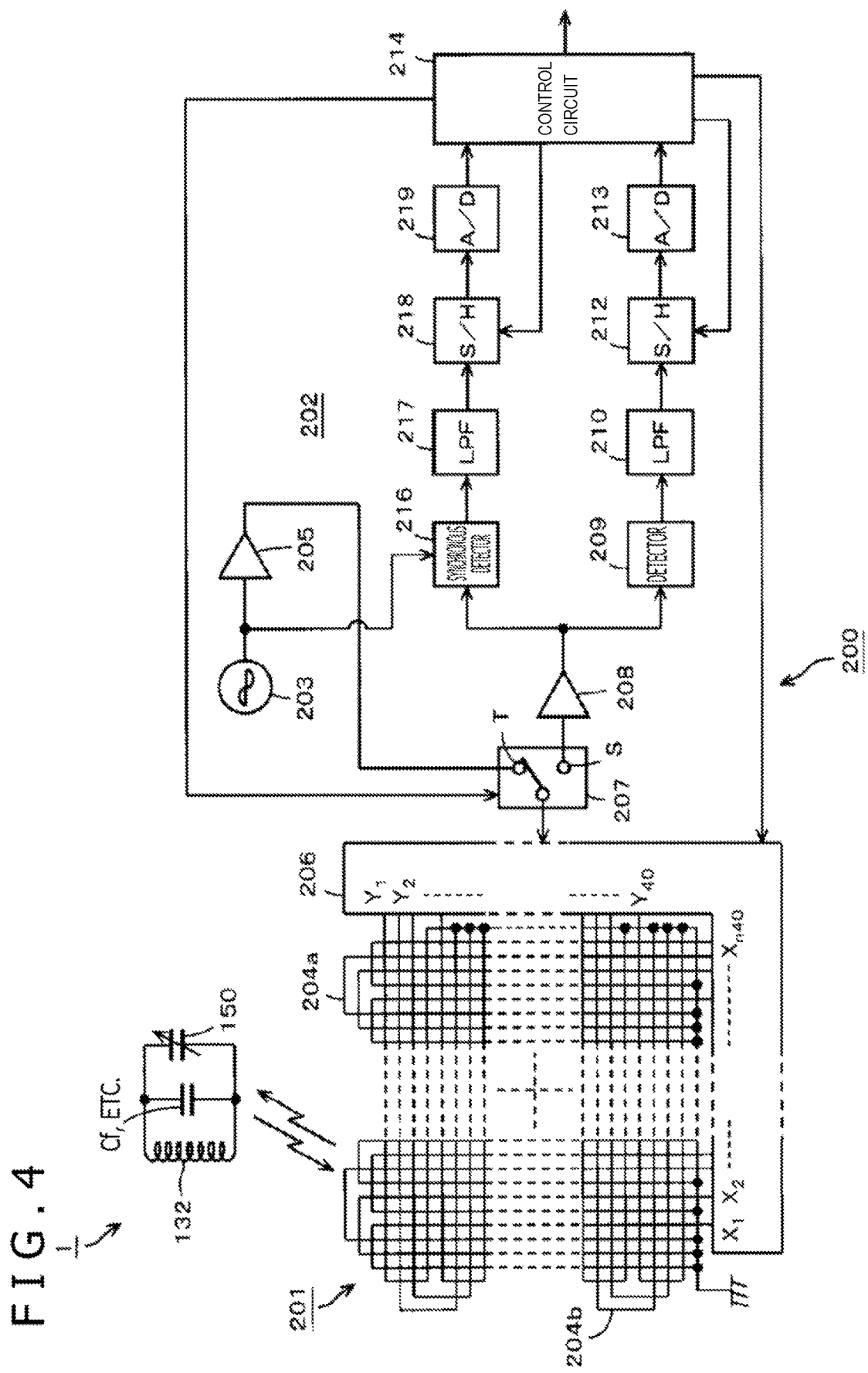

ELECTRONIC PEN

BACKGROUND

Technical Field

The present disclosure relates to an electronic pen that implements a function as a position indicator for a capacitive coupling type or electromagnetic induction type position detection device, for example.

Background Art

For example, to draw a thin line when a sketch is drawn with a pencil, the pencil is used while being kept standing so as to be substantially perpendicular to a recording medium such as a plate or a paper sheet. In contrast, to paint out a wide area in order to, for example, apply shading thereto, the pencil is used while being tilted so as to be substantially horizontal to the recording medium. Specifically, while the pencil is tilted at 25 to 30 degrees with respect to the recording medium, drawing is performed by means of a side surface of a graphite portion of the pencil. Thus, painting to paint out a wide area can be performed.

In recent years, a use mode of drawing (inputting) digital pictures on a drawing apparatus such as a tablet-type information terminal with an electronic pen is becoming popular. As a result, there has been a demand for, also when drawing a picture on a drawing apparatus with an electronic pen, using the electronic pen in a use mode of filling in or shading a wide area, as in the aforementioned case using a pencil. To reflect the input performed by the electronic pen on the drawing apparatus, the electronic pen needs to be detected by a position detection device incorporated in the drawing apparatus. The position detection device detects the position of the pen tip of the electronic pen and the value of the pen pressure applied to the pen tip.

The pen pressure of the electronic pen is detected by a core body pressing against a pen-pressure detector inside the electronic pen according to the pen pressure. Generally, in a case where a character is written on a recording medium such as a paper sheet with a writing tool such as a pencil, the character is written with the writing tool tilted at an angle of 60 to 80 degrees with respect to the recording medium. In a case where a character is inputted to a position detector with an electronic pen in such state, the pressing force of the pen tip is transferred through a core body to press a pen-pressure detector.

However, in a case where the electronic pen is used in such a manner to apply shading to an object drawn on a recording medium with a writing tool laid down (tilted) at 25 to 30 degrees as described above, the core body is warped in a direction intersecting an axis of the electronic pen. Accordingly, the pen pressure is not transferred to the pen-pressure detector. In view of this, as disclosed in Japanese Patent Laid-Open No. 2008-269244, referred to as Patent Document 1 hereinafter, electronic pens have been devised to be able to appropriately detect pen pressures even when the electronic pen are used in a substantially horizontal state.

However, in the above-described method disclosed in Patent Document 1, an electronic pen has a complicated configuration. Further, since a component for transmitting signals is disposed in a tip end portion of a casing of an electronic pen into which a core body is inserted, the tip end portion of the casing of the electronic pen is thick to some degree, in many cases. Therefore, in the method disclosed in Patent Document 1, when being tilted, the tip end portion of the casing comes into contact with an operation surface of a position detection device, so that the core body comes off. Accordingly, drawing may not be performed with the electronic pen largely tilted. In other words, in the method disclosed in Patent Document 1, in a case where the electronic pen is used while being tilted so as to be substantially horizontal, the use mode of filling in or shading a wide area as if a pencil is used while being tilted so as to be substantially horizontal, may not be sufficiently implemented in some cases.

BRIEF SUMMARY

In view of the aforementioned circumstances, an object of the present disclosure is to implement an electronic pen which, when being used while being tilted so as to be substantially horizontal, can input an indication to an drawing apparatus in a mode of filling in or shading a wide area as if a pencil is used while being tilted so as to be substantially horizontal.

In order to solve the above problems, an electronic pen according to an aspect of the present disclosure includes a core body including a tip portion having a tip and a tapered side surface that is tapered toward the tip and having a recessed section that is recessed toward a side of the core body that includes the tip from a side of the core body that is opposite to the side of the core body that includes the tip, and including a core rod that passes through a center axis of the recessed section from a tip side of the tip portion that includes the tip and extends away from the tip, and a tubular casing in which a pen-pressure detector is installed, the core body being attached to the tubular casing in an axially movable manner such that the core rod of the core body is pressable against the pen-pressure detector, and the tubular casing having a surface that is adjacent to an inner or outer surface of the recessed section of the core body.

In the electronic pen according to the aspect of the present disclosure, the core body includes the tip portion having the tapered side surface and the recessed section, and includes the core rod. To the tubular casing having the pen-pressure detector installed therein, the core body is attached in an axially movable manner such that the core rod can press the pen-pressure detector. The casing has a surface that is adjacent to an inner or outer surface of the recessed section of the core body in a state where the core body is attached to the casing.

Thus, even when a pen pressure is applied to the tapered side surface of the tip portion with the electronic pen tilted so as to be substantially horizontal, warping of the core rod of the core body can be restricted (prevented), the core rod can press the pen-pressure detector according to the pen pressure, and the pen pressure can be appropriately detected, because the casing has a surface that is adjacent to the inner or outer surface of the recessed section of the core body. Consequently, even when the electronic pen is used while being tilted so as to be substantially horizontal, an indication can be appropriately inputted.

BRIEF DESCRIPTION OF THE DRAWINGS

FIG. 3A is a cross-sectional view of the core body of the electronic pen;

FIG. 3B is a cross-sectional view of the core body side of the casing;

FIG. 4 is a diagram illustrating a circuit configuration example of an electromagnetic induction type electronic pen and a position detection device;

DETAILED DESCRIPTION OF THE PREFERRED EMBODIMENTS

Hereinafter, embodiments of an electronic pen according to the present disclosure will be described with reference to the drawings.

First Embodiment

[One Example of External Appearance of Electronic Pen 1]

Figure 1:
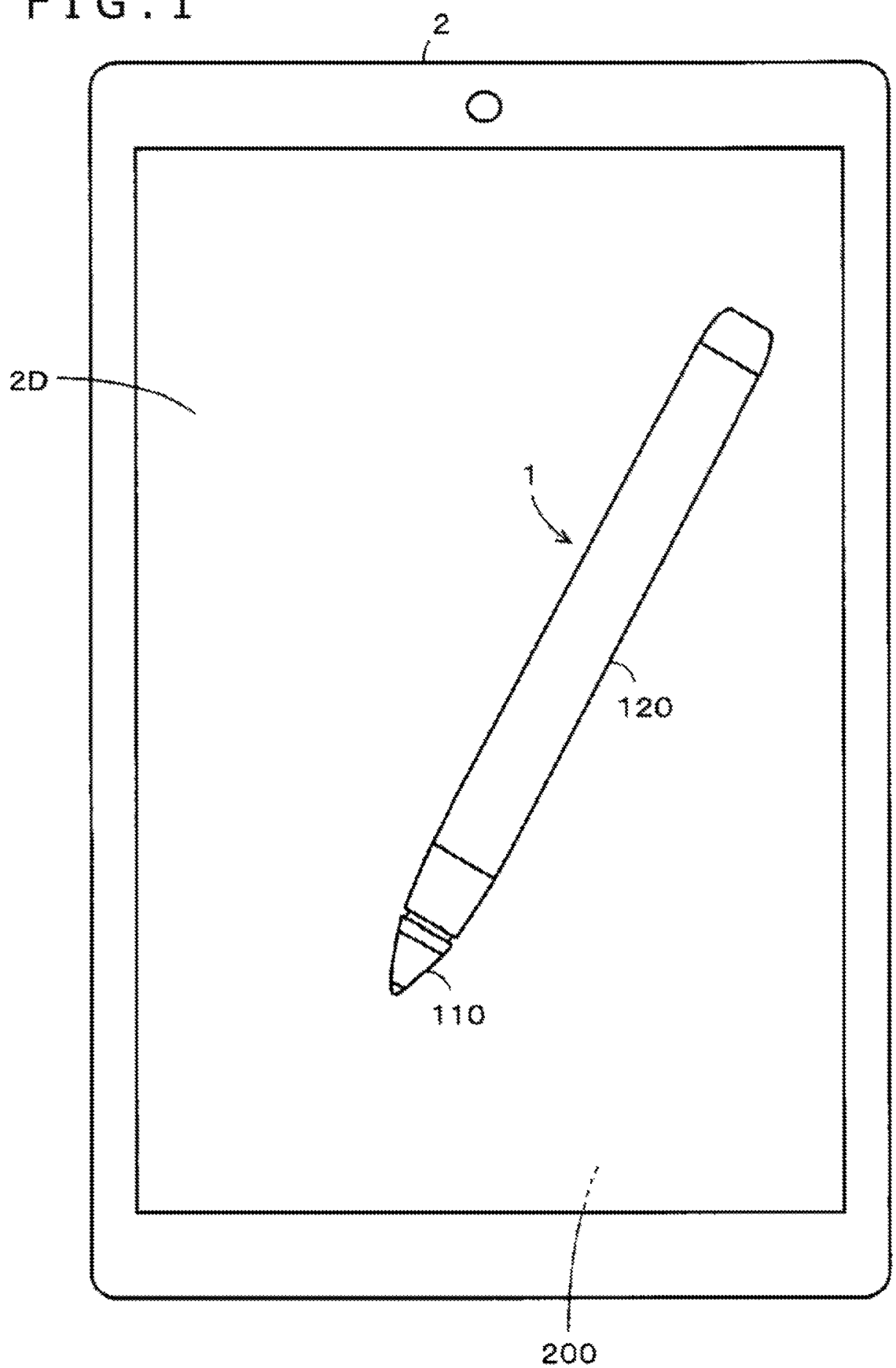
FIG. 1 is a diagram illustrating an external appearance of an electronic pen according to a first embodiment of the present disclosure and an external appearance of a tablet-type information terminal on which information is inputted with the electronic pen.

FIG. 1 is a diagram illustrating an entire external appearance of an electronic pen 1 according to the first embodiment and an external appearance of a tablet-type information terminal 2 on which information is inputted with the electronic pen 1. The external appearance configuration of the electronic pen 1 roughly includes two parts: a core body 110 and a casing 120. The core body 110 is a part which corresponds to a tip of a fountain pen or the like. The casing 120 is a part which is grasped by a user's hand. The electronic pen 1 functions as a pen-type position indicator (coordinate indicator) which is used when information is inputted to the tablet-type information terminal 2.

Meanwhile, the tablet-type information terminal 2 has a configuration in which a relatively large display screen 2D of a display device such as a liquid crystal display (LCD) is exposed. A position detection device (input device) 200 having a sensor part that handles the entire surface of the display screen 2D is installed in a rear portion of the display screen 2D so as to enable, when any position on the display screen 2D is indicated, detection of the indicated position. Note that the sensor part of the position detection device 200 may be provided in the rear portion (rear surface) of the display screen 2D, or may be provided in a front portion (front surface). In this example, the sensor part is provided on the rear portion of the display screen 2D. Further, inside the casing of the tablet-type information terminal 2, the display device (LCD or the like) and the input device (position detection device 200) are connected, and an information processing device unit (not illustrated) for performing various information processing is installed.

Thus, the tablet-type information terminal 2 is an information processing apparatus the main input device of which is the position detection device 200. For example, a protective glass or the like is provided on the display screen 2D, and an indication can be inputted on the display screen 2D as an operation surface via the protective glass by means of the electronic pen. In the tablet-type information terminal 2, a position indicating operation is assumed to be performed on the display screen 2D by means of the electronic pen 1. In this case, a processing unit (central processing unit (CPU)) included in the position detection device 200 specifies an indicated position on the display screen 2D on the basis of a detection output from the sensor part of the position detection device 200 provided in the rear portion of the display screen 2D. Information indicating the indicated position specified by the processing unit is supplied to the information processing device unit installed in the tablet-type information terminal 2, and thus, a process corresponding to this information can be performed.

Note that examples of the position detection device to which a position indication can be inputted with the electronic pen, include an electromagnetic induction type (electro magnetic resonance technology (EMR) type) one and an active capacitive coupling type (active electrostatic (AES) type) one. The present disclosure is applicable to electronic pens corresponding to position detection devices of both the types. Hereinafter, first, a case where the present disclosure is applied to an electromagnetic induction type electronic pen which is used for an electromagnetic induction type position detection device will be described as a first embodiment. Next, a capacitive coupling type electronic pen will be described as a second embodiment.

[Configuration Example of Electromagnetic Induction Type Electronic Pen 1]

Figure 2A:
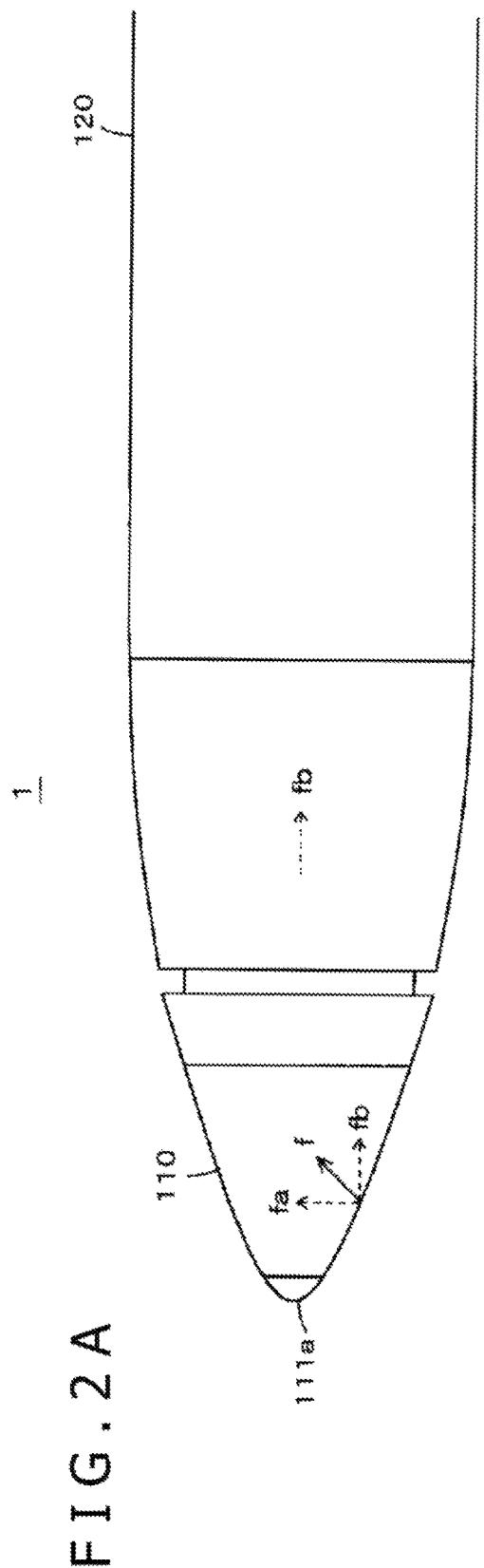
FIG. 2A is a diagram of an external appearance of a connection portion between a core body and a casing of the electronic pen.
Figure 2B:
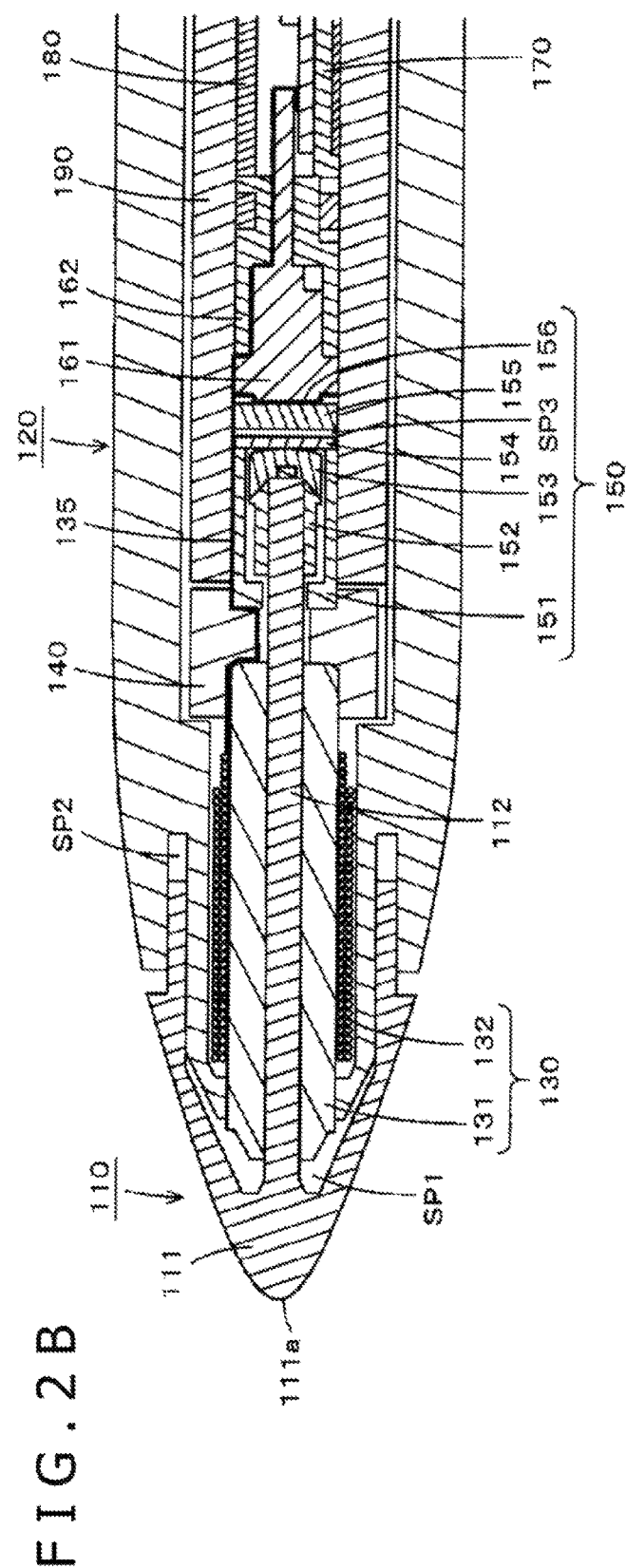
FIG. 2B is a cross-sectional view of the connection portion.

FIG. 2A is a diagram of an external appearance of a connection portion between the core body 110 and the casing 120 of the electronic pen 1 according to the first embodiment, and FIG. 2B is a cross-sectional view of the connection portion. As illustrated in the diagram of the external appearance in FIG. 2A, the external appearance of the electronic pen 1 roughly includes two parts: the core body 110 and the casing 120. As illustrated in FIG. 2B, the core body 110 includes a tip portion 111 a tip 111a of which has a rounded triangular pyramid (cone) shape, and a core rod 112 which is provided at a position matching a center axis of the tip portion 111 and which extends in a direction away from the tip 111a.

The casing 120 is formed into a tubular shape, and an electronic pen function part for implementing the function of the electronic pen is housed in the casing 120. More specifically, as illustrated in FIG. 2B, a coil portion 130 having a coil 132 formed by winding a coated wire around a side surface of a ferrite core 131a that has a through hole through which the core rod 112 of the core body 110 passes, is provided on the core body 110 side in the casing 120. A pen-pressure detector 150 is connected to a rear end side of the coil portion 130 via a connection member 140.

In the pen-pressure detector 150, in a holder 151 having an opening on the core body 110 side, a holding member 152 which holds the core rod 112 inserted through the opening and a press member 153 which is pressed by the core rod 112 held by the holding member 152 are housed, as illustrated in FIG. 2B. The holding member 152 is formed from an elastic material such as rubber, and the core rod 112 can be inserted into and removed from the holding member 152. However, the holding member 152 is configured to be capable of holding the core rod 112 so as to prevent the core rod 112 from easily coming off in a state where the core rod 112 is inserted.

An end of the holder 151 on the press member 153 side has an opening, and is closed with a conductive rubber 154. The conductive rubber 154 functions as one electrode of a variable capacitor, which will be described later. A ring-shaped spacer (not illustrated) is provided on a side, of the conductive rubber 154, opposite to the holder 151, and a dielectric body 155 is provided with the spacer interposed between the conductive rubber 154 and the dielectric body 155. Consequently, a structure in which a space SP3 is provided between the conductive rubber 154 and the dielectric body 155, is obtained. Another electrode 156 is provided on a surface, of the dielectric body 155, opposite to the conductive rubber 154.

Thus, the conductive rubber 154 and the electrode 156 are provided so as to be opposed to each other with the dielectric body 155 interposed therebetween. This configuration forms a capacitor. Further, the space SP3 is provided between the conductive rubber 154 and the dielectric body 155, as described above. Therefore, the capacitor functions as a variable capacitor the capacitance of which varies according to how close the conductive rubber 154 is to the dielectric body.

The tip portion 111 of the core body 110 has a recessed section which is recessed from the opposite side (bottom surface side) of the tip 111a toward the tip 111a side (the details of the recessed section will be described later). Accordingly, when the core body 110 is attached to the casing 120 having the electronic pen function part installed therein, a tip end portion of the casing 120 and a tip end portion of the ferrite core 131 constituting the electronic pen function part enter the recessed section of the tip portion 111 of the core body 110, as illustrated in FIG. 2B. In this case, spaces SP1 and SP2 are provided between the core body 110 and the casing 120, as illustrated in FIG. 2B.

Accordingly, when a pen pressure is applied to the core body 110, the core body 110 is pushed toward the casing 120 side, so that the core rod 112 of the core body 110 pushes the conductive rubber 154 toward the dielectric body 155 side via the press member 153 of the pen-pressure detector 150. When the pen pressure applied to the core body 110 is released, the core body 110 is pushed back by an elastic force of the conductive rubber 154 or the like. Therefore, the state of the conductive rubber 154 approaching the dielectric body 155 varies according to the pen pressure applied to the core body 110, so that the capacitance of the pen-pressure detector 150 varies. According to this varying capacitance, the pen pressure applied to the core body 110 can be precisely detected.

The pen-pressure detector 150 is inserted into an inner casing 190 formed into a tubular shape, and a board holding member 161 is provided, on the electrode 156 side of the pen-pressure detector 150, so as to press the electrode 156 toward the dielectric body 155 side, as illustrated in FIG. 2B. The board holding member 161 is held by a tubular fixation member 162 so as not to rattle in a direction intersecting an axis inside the inner casing 190. A circuit board 170 is sandwiched between the board holding member 161 and the fixation member 162, and is held in the inner casing 190. For the circuit board 170, various circuit elements including a plurality of capacitors and an integrated circuit (IC) constituting a control unit are used, and thus, an electronic circuit is formed.

The circuit board 170 and the fixation member 162 positioned below the circuit board 170 are housed in a board protection pipe 180, and an end of the board protection pipe 180 on the core body 110 side abuts on an end of the fixation member 162. A lid (not illustrated) is provided for closing by abutting on another end of the board protection pipe 180 on a rear end side from the rear end of the inner casing 190. As a result, the respective positions of the pen-pressure detector 150, the board holding member 161, the fixation member 162, the circuit board 170, and the board protection pipe 180 are fixed in the inner casing 190. Further, as described above, the coil portion 130 and the pen-pressure detector 150 are connected via the connection member 140. Moreover, the inner casing 190 is pressed, by a predetermined lid, from the rear end of the casing 120 toward the core body 110 side, whereby the positions are restricted.

The coil 132 disposed around the ferrite core 131 and the electronic circuit formed on the circuit board 170 are connected via a conductive wire 135, as illustrated in FIG. 2B. Although only one conductive wire is depicted in FIG. 2B, both ends of the coil 132 are connected to the electronic circuit on the circuit board 170. The electronic circuit formed on the circuit board 170 is formed by using circuit elements including a plurality of capacitors, as described above, and the coil 132 and the capacitors on the circuit board 170 constitute a resonance circuit. The conductive rubber 154 and the electrode 156 of the pen-pressure detector 150 are also connected to the electronic circuit on the circuit board 170 via a conductive wire. Thus, the electronic pen function part including, as main components thereof, the coil portion 130, the pen-pressure detector 150, and the circuit board 170 is included in the casing 120.

Accordingly, a signal transmitted from the electromagnetic induction type position detection device 200 of the tablet-type information terminal 2 is received at the resonance circuit including the coil 132 and the capacitor of the electronic pen 1. The resonance circuit of the electronic pen 1 generates a signal corresponding to the received signal, and transmits the generated signal to the position detection device 200. At this time, the phase of the transmission signal is adjusted according to the pen pressure detected by the pen-pressure detector 150, and the pen pressure applied to the core body 110 of the electronic pen 1 is also reported to the position detection device 200.

It is assumed that an indication is inputted with the electronic pen 1 tilted (laid down) with respect to the operation surface of the display screen 2D of the tablet-type information terminal 2 so as to bring the side surface of the tip portion 111 of the core body 110 into contact with the operation surface. Since the tip portion 111 of the core body 110 has a triangular pyramid shape (tapered shape), as having been described with use of FIGS. 2A and 2B, the side surface of the tip portion 111 is inclined. Thus, the pen pressure is applied, as indicated by a solid-line arrow f in FIG. 2A. As indicated by dotted-line arrows in FIG. 2A, the pen pressure f includes a component fa in a direction intersecting the axis of the electronic pen 1 and a component fb in a direction extending along the axis of the electronic pen 1.

Accordingly, when the pen pressure f is applied to the side surface of the tip portion 111 of the core body 110, the component fb of the pen pressure f is applied to the core rod 112 of the core body 110. The applied component fb is transferred to the pen-pressure detector 150, whereby the pen pressure can be detected. When both the indicated position and the pen pressure can be detected, an indication can be inputted to the tablet-type information terminal 2. Thus, for example, an indication for applying shading as if a pencil is used while being tilted can be inputted to the tablet-type information terminal 2 with the electronic pen 1.

[Configuration of Connection Portion between Core Body 110 and Casing 120 of Electronic Pen 1]

FIG. 3A is a cross-sectional view of the core body 110 of the electronic pen 1 according to the first embodiment, and FIG. 3B is a cross-sectional view of the core body 110 side of the casing 120. As described above, the core body 110 includes the tip portion 111 and the core rod 112. The tip portion 111 of the core body 110 has the tip 111a having a rounded triangular pyramid (cone) shape. As illustrated in FIG. 3A, a side surface 111b forms a tapered shape of the tip portion 111. An end surface 111c extending in a direction intersecting the axis is formed at the end, of the side surface 111b, opposite to the tip 111a. More specifically, the end surface 111c is a ring-like surface section formed at the end of the side surface 111b.

Further, a fitting section 111d extending in the axis direction from the end surface 111c is provided, as illustrated in FIG. 3A. More specifically, the fitting section 111d is a tubular section extending in the axis direction from the end surface 111c which is the ring-shaped surface section. A recessed section 113 recessed toward the tip 111a side from the end (end side of the fitting section 111d), of the tip portion 111, opposite to the tip 111a, is provided in the tip portion 111.

Note that the recessed section 113-side side surface of the fitting section 111d is an inner wall surface 111i, and the side surface opposite to the recessed section 113 is an outer wall surface 111o. Also, the end of the fitting section 111d is an end surface 111e extending in a direction intersecting the axis. Thus, the end surface of the fitting section 111d is also a ring-shaped surface section.

The core rod 112 passes through the center axis of the tip portion 111 (center axis of the recessed section 113) from the tip 111a side of the tip portion 111, and extends in a direction away from the tip 111a, as illustrated in FIG. 3A. As has been described with use of FIG. 2B, the core rod 112 presses the pen-pressure detector 150 according to the pen pressure applied to the tip portion 111 of the core body 110.

Meanwhile, the casing 120 has an outer tubular portion 121 provided on a side thereof to which the core body 110 is attached, and has an inner tubular portion 122 provided at a predetermined space on the axis side relative to the outer tubular portion 121. The predetermined space is set to a distance slightly larger than a thickness of the fitting section 111d of the core body 110. An end of the outer tubular portion 121 is an end surface 121e extending in a direction intersecting the axis direction. The end surface 121e is a ring-shaped surface section centered on the center axis of the casing 120. Then, the inner tubular portion 122 has a shape further projected toward a side to which the core body 110 is attached, than the outer tubular portion 121, and an opening section 120a is formed on an end of the inner tubular portion 122. The opening section 120a-side end section of the inner tubular portion 122 is a projected section 122a projected in the axis direction in order to position the coil portion 130 inside the casing 120, as illustrated in FIG. 2B.

When the casing 120 is viewed from the opening section 120a side, the outer tubular portion 121 and the inner tubular portion 122 are formed concentrically about the axis. Thus, the outer tubular portion 121 and the inner tubular portion 122 are formed so as to be separated from each other by a predetermined distance in a direction intersecting the axis, whereby a fitting groove 123 is formed between the outer tubular portion 121 and the inner tubular portion 122. The bottom of the fitting groove 123 is a bottom surface 123e.

Then, the core rod 112 of the core body 110 illustrated in FIG. 3A is inserted from the opening section 120a of the casing 120 illustrated in FIG. 3B, and the fitting section 111d of the core body 110 is fitted into the fitting groove 123 of the casing 120, whereby the core body 110 is attached to the casing 120. In this case, the end surface 111c of the side surface 111b of the core body 110 is opposed to the end surface 121e of the outer tubular portion 121 of the casing 120, and the end surface 111e of the fitting section 111d of the core body 110 is opposed to the bottom surface 123e of the fitting groove 123 of the casing 120.

Then, in the state where the core body 110 is attached to the casing 120, the portion of the inner tubular portion 122 of the casing 120 is in a state of being inserted in the recessed section 113 of the tip portion 111 of the core body 110. When the electronic pen function part is installed in the casing 120, as illustrated in FIG. 2B, the end portion of the ferrite core 131 of the coil portion 130 is projected from the opening section 120a of the inner tubular portion 122. Therefore, the end portion of the ferrite core 131 is also positioned in the recessed section 113 of the tip portion 111 of the core body 110.

Thus, in the state where the core body 110 is attached to the casing 120, an outer wall surface 122o of the inner tubular portion 122 of the casing 120 is opposed to an inner wall surface 111i of the fitting section 111d of the core body 110. In addition, an inner wall surface 121i of the outer tubular portion 121 of the casing 120 is opposed to the outer wall surface 111o of the fitting section 111d of the core body 110. As illustrated in FIG. 2B, the space SP1 is provided between the inside of the tip portion 111 of the core body 110 and the ferrite core 131 and the inner tubular portion 122. Further, the space SP2 is provided between the end surface 111e of the fitting section 111d of the core body 110 and the bottom surface 123e of the fitting groove 123 of the casing 120. Therefore, the core body 110 is configured to be able to slidably move (be pushed down/up) in the axis direction.

Thus, it is assumed that the pen pressure f is applied to the side surface 111b of the tip portion 111 of the core body 110, as illustrated in FIG. 2A. In this case, the component fa in a direction intersecting the axis direction is inhibited by a three-layer structure in which the inner tubular portion 122 of the casing 120, the fitting section 111d of the core body 110, and the outer tubular portion 121 of the casing 120 are layered in a direction intersecting the axis direction. Accordingly, the core rod 112 of the core body 110 is not warped in a direction intersecting the axis of the electronic pen 1. Meanwhile, the component fb in the axis direction appropriately acts on the core body 110. Accordingly, as a whole, the pen pressure f applied to the side surface 111b of the tip portion 111 is efficiently transferred to the core rod 112 so as to appropriately slidingly move the core body 110 in the axis direction.

As a result, the core rod 112 of the core body 110 appropriately can press the pen-pressure detector 150 according to the pen pressure applied to the side surface 111b of the tip portion 111 of the core body 110, and the pen pressure applied to the side surface 111b can also be appropriately detected. Further, as described above, when both the indicated position and the pen pressure can be detected, the indication can be inputted to the tablet-type information terminal 2. Thus, an indication for applying shading as if a pencil is used while being laid down, for example, can be inputted to the tablet-type information terminal 2 with the electronic pen 1.

As a result of this, an electronic image to be drawn on the tablet-type information terminal 2 with the electronic pen 1 can be drawn by the same touch as an image drawn on a paper sheet with a pencil. Consequently, the variation of an indication input using the electronic pen 1 can be increased, and the diversity of expression can be enlarged.

[Circuit Configuration Example of Electromagnetic Induction Type Electronic Pen 1 and Position Detection Device 200]

FIG. 4 is a diagram illustrating a circuit configuration example of the electronic pen 1 and the position detection device 200. In the present embodiment, each of the electronic pen 1 and the position detection device 200 is an electromagnetic induction type, as described above. As illustrated in the upper left part of FIG. 4, the electronic pen 1 is configured as a resonance circuit formed by parallelly connecting the coil 132 for use in transmission and reception of signals, the pen-pressure detector 150 which is a variable capacitor, a resonance capacitor Cf provided on the circuit board 170, and the like.

Meanwhile, the position detection device 200 includes a position (coordinate) detection sensor 201 and a position detection circuit 202. The position detection sensor 201 is formed by layering an X-axis direction loop coil group 204a and a Y-axis direction loop coil group 204b. The loop coil groups 204a and 204b are each formed of 40 rectangular loop coils, for example. The loop coils constituting each of the loop coil groups 204a and 204b are arranged so as to sequentially overlap one another at equal intervals.

The position detection circuit 202 includes an oscillator 203, a current driver 205, a selection circuit 206, a switchover connection circuit 207, and a reception amplifier 208. Further, the position detection circuit 202 includes a position detection system including a detector 209, a low-pass filter 210, a sample hold circuit 212, and an analog to digital (A/D) conversion circuit 213, a pen-pressure detection system including a synchronous detector 216, a low-pass filter 217, a sample hold circuit 218, and an A/D conversion circuit 219, and a control circuit 214 (e.g., including a microprocessor).

The oscillator 203 generates an alternating current (AC) signal having a frequency f0, and supplies the AC signal to the current driver 205 and the synchronous detector 216. The current driver 205 converts the AC signal supplied from the oscillator 203 into current, and transmits the current to the switchover connection circuit 207. The switchover connection circuit 207 switches, under the control of the control circuit 214, connection destinations (transmission-side terminal T, reception-side terminal S) for a loop coil selected by the selection circuit 206 that sequentially selects one loop coil from among the two loop coil groups 204a and 204b. The current driver 205 and the reception amplifier 208 are connected to, among the connection portions, the transmission-side terminal T and the reception-side terminal R, respectively.

Induced voltage generated at the loop coil selected by the selection circuit 206 is transmitted to the reception amplifier 208 via the selection circuit 206 and the switchover connection circuit 207. The reception amplifier 208 amplifies the induced voltage supplied from the loop coil, and transmits the voltage to the detector 209 and the synchronous detector 216.

The detector 209 detects the induced voltage generated at the loop coil, i.e., a received signal, and transmits the signal to the low-pass filter 210. The low-pass filter 210, which has a cutoff frequency sufficiently lower than the aforementioned frequency f0, converts the output signal of the detector 209 to a direct current (DC) signal, and transmits the DC signal to the sample hold circuit 212. The sample hold circuit 212 holds the voltage value of the output signal from the low-pass filter 210 at a predetermined timing, or specifically, at a predetermined timing during the reception time period, and transmits the voltage value to the A/D conversion circuit 213. The A/D conversion circuit 213 converts the analog output from the sample hold circuit 212 to a digital signal, and outputs the digital signal to the control circuit 214.

Meanwhile, the synchronous detector 216 detects the output signal from the reception amplifier 208 in synchronization with an AC signal from the oscillator 203, and transmits, to the low-pass filter 217, a signal having a level corresponding to the phase difference between these signals. The low-pass filter 217, which has a cutoff frequency sufficiently lower than the frequency f0, converts the output signal from the synchronous detector 216 to a DC signal, and transmits the DC signal to the sample hold circuit 218. The sample hold circuit 218 holds the voltage value of the output signal from the low-pass filter 217 at a predetermined timing, and transmits the voltage value to the A/D conversion circuit 219. The A/D conversion circuit 219 converts the analog output from the sample hold circuit 218 to a digital signal, and outputs the digital signal to the control circuit 214.

The control circuit 214 controls the components of the position detection device 200. That is, the control circuit 214 controls selection of a loop coil by the selection circuit 206, switchover at the switchover connection circuit 207, and the timings of the sample hold circuits 212 and 218. The control circuit 214 causes the X-axis direction loop coil group 204a and the Y-axis direction loop coil group 204b to transmit electric waves for a fixed transmission duration time on the basis of the input signals from the A/D conversion circuits 213 and 219.

At each of the loop coils of the X-axis direction loop coil group 204a and the Y-axis direction loop coil group 204b, induced voltage is generated by electric waves transmitted from the electronic pen 1. The control circuit 214 calculates the coordinate values, in the X-axis direction and the Y-axis direction, of the indicated position of the electronic pen 1 on the basis of the level of the voltage value of the induced voltage generated at each of the loop coils. Further, the control circuit 214 detects the pen pressure on the basis of the phase difference between the transmitted electric waves and the received electric waves.

Thus, the electromagnetic induction type electronic pen 1 according to the present embodiment and the electromagnetic induction type position detection device 200 illustrated in FIG. 4 constitute an input device for the tablet-type information terminal 2. An indication can be inputted to the tablet-type information terminal 2 with the electronic pen 1, as in the conventional manner. Further, the electronic pen 1 is used while being laid down with respect to the operation surface of the tablet-type information terminal 2 such that the side surface 111b of the tip portion 111 of the electronic pen 1 is brought into contact with the operation surface, whereby an indication can be inputted. In other words, the electronic pen 1 can be used in the same usage way as that for applying shading with a pencil laid down with respect to a paper sheet so as to bring a core thereof into contact with a wider range on the paper sheet.

[Modification (1) of Electronic Pen 1]

Figure 5A:
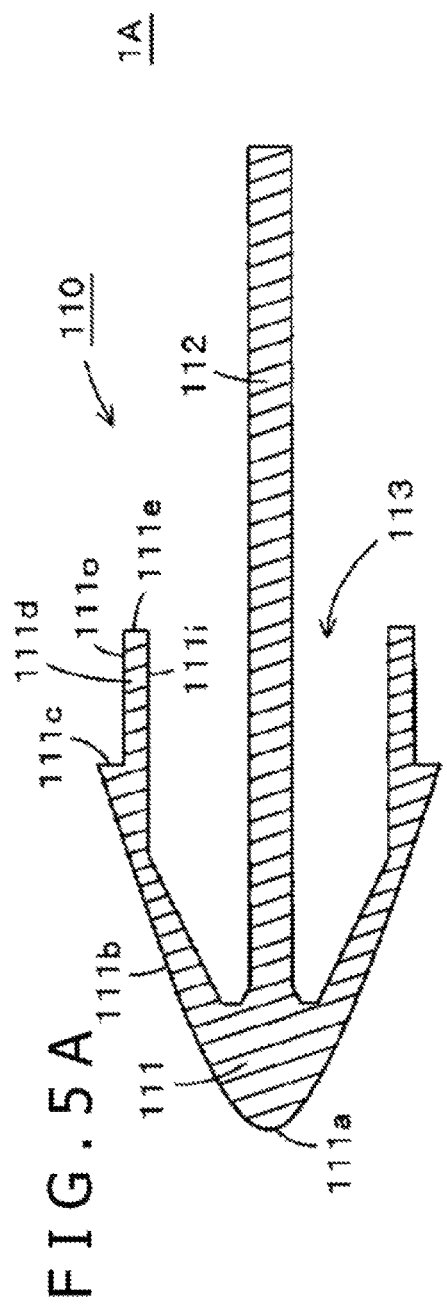
FIG. 5A is a cross-sectional view of a core body according to a modification of the electronic pen.
Figure 5B:
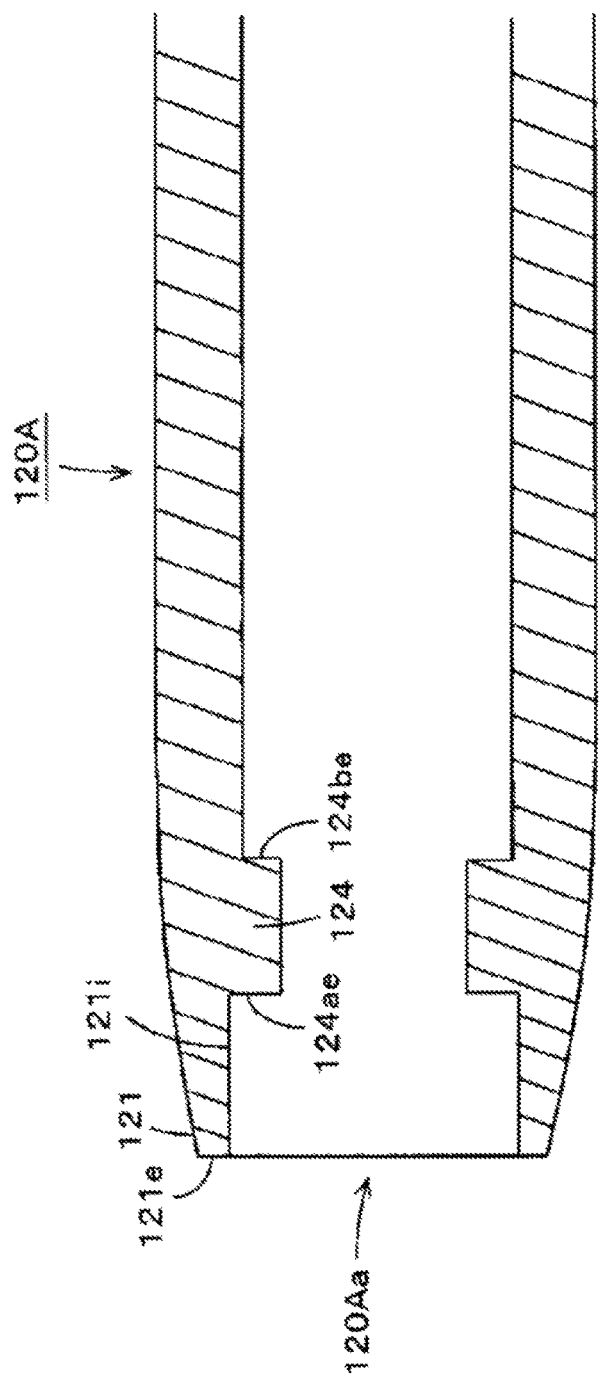
FIG. 5B is a cross-sectional view of a casing according to the modification.

FIGS. 5A and 5B are explanatory diagrams of an electronic pen 1A which is a modification of the electronic pen 1. FIG. 5A is a cross-sectional view of the core body 110 of the electronic pen 1A. FIG. 5B is a cross-sectional view of a casing 120A of the electronic pen 1A. In FIGS. 5A and 5B, components having the same configurations as those in the electronic pen 1 having been described with use of FIGS. 3A and 3B, are denoted by the same reference numerals, and a detailed description thereof will be omitted. In other words, the core body 110 illustrated in FIG. 5A has the same configuration as that of the core body 110 illustrated in FIG. 3A. The casing 120A illustrated in FIG. 5B differs from the casing 120 illustrated in FIG. 3B.

The casing 120 of the electronic pen 1 having been described with use of FIG. 3B includes the outer tubular portion 121 and the inner tubular portion 122. In contrast, the casing 120A of the electronic pen 1A illustrated in FIG. 5B includes the outer tubular portion 121, but does not include the inner tubular portion 122. As illustrated in FIG. 5B, a side, of the outer tubular portion 121, to which the core body 110 is attached is an opening section 120Aa, and a ring-shaped projected section 124 is formed at a position, in the casing 120A, closer to the opening section 120Aa.

In the case of the casing 120 illustrated in FIG. 3B, the tube extends from the projected section 124 to the side to which the core body 110 is attached, so that the inner tubular portion 122 is formed. In contrast, in the case of the casing 120A illustrated in FIG. 5B, the opening section 120Aa side of the projected section 124 is a ring-shaped end surface 124*ae*. Also, the rear end side of the projected section 124 is a ring-shaped end surface 124*be*.

The core rod 112 of the core body 110 is inserted into the casing 120A from the opening section 120Aa, and the tubular fitting section 111*d* of the core body 110 is fitted to the inside of the outer tubular portion 121 of the casing 120A. In this case, the inner wall surface 121*i* of the outer tubular portion 121 is opposed to the outer wall surface 111*o* of the fitting section 111*d* of the core body 110. Further, the end surface 111*c* of the side surface 111*b* of the core body 110 is opposed to the end surface 121*e* of the outer tubular portion 121 of the casing 120A, and the end surface 111*e* of the fitting section 111*d* of the core body 110 is opposed to the end surface 124*ae* of the projected section 124 of the casing 120A.

Also in the casing 120A of this modification illustrated in FIG. 5B, the electronic pen function part is installed as in the case having been described with use of FIG. 2B. As described above, the electronic pen function part includes the coil portion 130, the connection member 140, the pen-pressure detector 150, the board holding member 161, the fixation member 162, the circuit board 170, the board protection pipe 180, the inner casing 190, and the like. As described above, the coil portion 130 and the pen-pressure detector 150 are connected via the connection member 140. The connection member 140 engages with the end surface 124*be* on the rear end side of the projected section 124, so that the position of the electronic pen function part is restricted so as not to move to the opening section 120Aa side.

In the electronic pen 1A of this modification, since the casing 120A does not include the inner tubular portion 122, the core body-side section of the coil portion 130 directly enters the recessed section 113 of the tip portion 111 of the core body 110. It is assumed that, in the electronic pen 1A of this modification having the above configuration, the pen pressure f is applied to the side surface 111*b* of the tip portion 111 of the core body 110 attached to the casing 120A, as indicated by the arrow in FIG. 2A. In this case, the component fa in the direction intersecting the axis of the electronic pen 1A is inhibited by a portion where the outer tubular portion 121 of the casing 120A and the fitting section 111*d* of the core body 110 overlap. Accordingly, the core rod of the core body 110 is not warped in a direction intersecting the axis of the electronic pen 1A.

Meanwhile, the component fb, of the pen pressure f applied to the side surface 111*b* of the core body 110, in the axis direction directly acts on the core body 110. Therefore, as a whole, the pen pressure f applied to the side surface 111*b* of the tip portion 111 is efficiently transferred to the core rod 112, so that the core body 110 is allowed to be slidably moved (pushed down/up) in the axis direction.

Accordingly, also in the case of the electronic pen 1A of the modification illustrated in FIGS. 5A and 5B, when the pen pressure is applied to the side surface 111*b* of the tip portion 111 of the core body 110, the core rod 112 of the core body 110 presses the pen-pressure detector 150, so that the pen pressure can be appropriately detected. When the indicated position and the pen pressure can be detected, the indication can be inputted to the tablet-type information terminal 2. Consequently, also with the electronic pen 1A illustrated in FIGS. 5A and 5B, an indication for applying shading as if a pencil is used while being laid down, can be inputted to the tablet-type information terminal 2.

[Modification (2) of Electronic Pen 1]

Figure 6A:
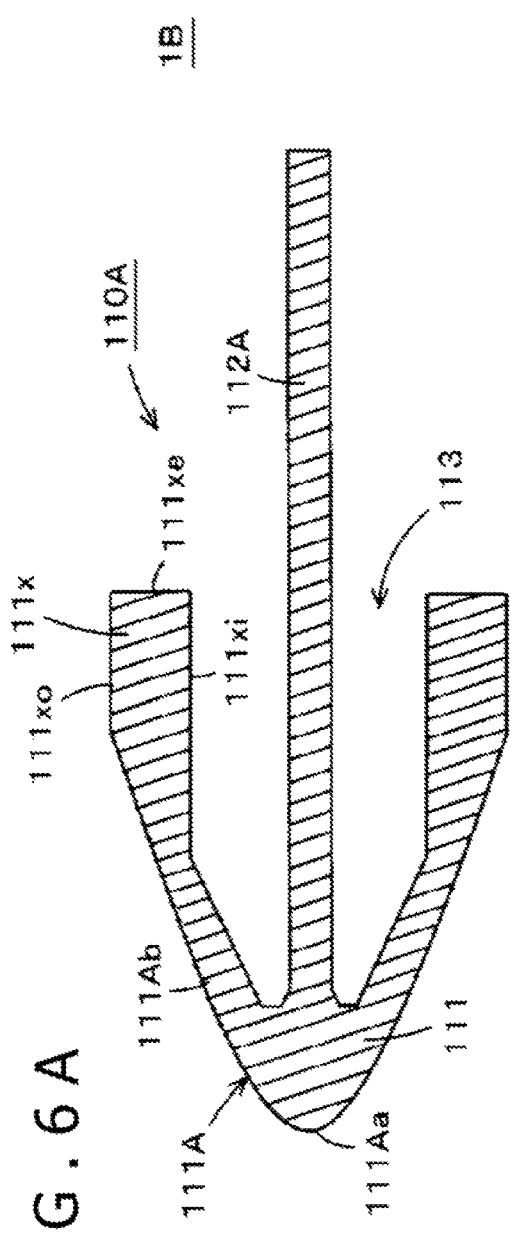
FIG. 6A is a cross-sectional view of a core body according to a modification of the electronic pen.
Figure 6B:
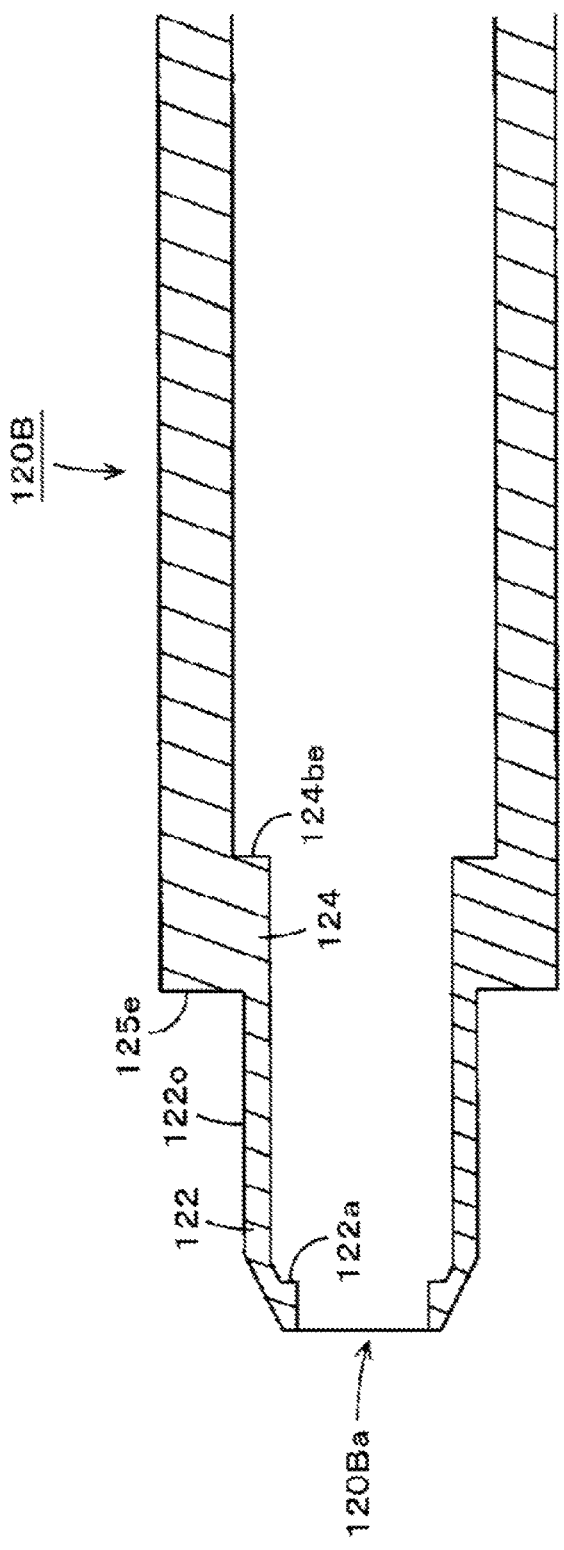
FIG. 6B is a cross-sectional view of a casing according to the modification.

FIGS. 6A and 6B are explanatory diagrams of an electronic pen 1B which is a modification of the electronic pen 1. FIG. 6A is a cross-sectional view of a core body 110A of the electronic pen 1B. FIG. 6B is a cross-sectional view of a casing 120B of the electronic pen 1B. In FIGS. 6A and 6B, components having the same configurations as those in the electronic pen 1 having been described with use of FIGS. 3A and 3B, are denoted by the same reference numerals, and a detailed description thereof will be omitted. That is, the core body 110A and the casing 120B of the electronic pen 1B of this modification differ in configuration from those of the electronic pen 1 having been described with use of FIGS. 3A and 3B.

The casing 120 of the electronic pen 1 having been described with use of FIG. 3B includes the outer tubular portion 121 and the inner tubular portion 122. In contrast, the casing 120A of the electronic pen 1B illustrated in FIG. 6B includes the inner tubular portion 122, but does not include the outer tubular portion 121. More specifically, in the case of the casing 120B of the electronic pen 1B illustrated in FIG. 6B, the tube extends from the projected section 124 to the side to which the core body 110 is attached, so that the inner tubular portion 122 is formed. A portion corresponding to the outer tubular portion 121 of the casing 120 illustrated in FIG. 3B is a ring-shaped end surface (flat surface) 125*e*, as illustrated in FIG. 6B. Also, the side, of the inner tubular portion 122, to which the core body 110 is attached is an opening section 120Ba, as illustrated in FIG. 6B, and the rear end side of the projected section 124 is a ring-shaped end surface 124*be*.

Thus, the casing 120B of the electronic pen 1B of this modification includes the inner tubular portion 122, but does not include the outer tubular portion 121. Accordingly, in the core body 110A, a fitting section 111*x* extending from an end of a side surface 111Ab that has a tapered shape tapered toward a tip 111Aa of the core body 110A is a tubular section which is wide (thick) so as to correspond to the end surface 125*e* of the casing 120B. More specifically, in the case of the core body 110 illustrated in each of FIGS. 3A and 5A, the side surface 111b includes the end surface 111c at the end thereof. In contrast, in the case of the core body 110A of the electronic pen 1B of this modification, the side surface 111Ab does not include the end surface 111c, and an outer wall surface 111xo of the fitting section 111x is continuously formed, as illustrated in FIG. 6A. As a result, the fitting section 111x of the core body 110A is a tubular section thicker than the fitting section 111d of the core body 110 illustrated in each of FIGS. 3A and 5A.

A core rod 112A of the core body 110A is then inserted into the casing 120B from the opening section 120Ba, and the tubular fitting section 111x of the core body 110A is fitted to the outer side of the inner tubular portion 122 of the casing 120B. In this case, the outer wall surface 122o of the inner tubular portion 122 is opposed to an inner wall surface 111xi of the fitting section 111x of the core body 110A. Further, an end surface 111xe of the fitting section 111x of the core body 110A is opposed to the end surface 125e of the casing 120B.

In this modification, the inner tubular portion 122 and the core body-side section of the coil portion 130 are configured to enter the recessed section 113 of the core body 110A. It is assumed that, in the electronic pen 1B of this modification having the above configuration, the pen pressure f is applied to the side surface 111Ab of the tip portion 111A of the core body 110A attached to the casing 120B, as indicated by the arrow in FIG. 2A. In this case, the component fa in a direction intersecting the axis of the electronic pen 1B is inhibited by a portion where the inner tubular portion 122 of the casing 120B and the fitting section 111x of the core body 110A overlap. Accordingly, the core rod 112A of the core body 110A is not warped in a direction intersecting the axis of the electronic pen 1B.

Meanwhile, the component fb, of the pen pressure f applied to the side surface 111Ab of the core body 110A, in the axis direction directly acts on the core body 110A. Therefore, as a whole, the pen pressure f applied to the side surface 111Ab of the tip portion 111A is efficiently transferred to the core rod 112A, so that the core body 110A is allowed to be slidably moved (pushed down/up) in the axis direction.

Accordingly, also in the case of the electronic pen 1B of the modification illustrated in FIGS. 6A and 6B, when the pen pressure is applied to the side surface 111Ab of the tip portion 111A of the core body 110A, the core rod 112A of the core body 110A presses the pen-pressure detector 150, so that the pen pressure can be appropriately detected. When the indicated position and the pen pressure can be detected, the indication can be inputted to the tablet-type information terminal 2. Consequently, also with the electronic pen 1B illustrated in FIGS. 6A and 6B, an indication for applying shading as if a pencil is used while being laid down, can be inputted to the tablet-type information terminal 2.

[Modification (3) of Electronic Pen 1]

Figure 7:
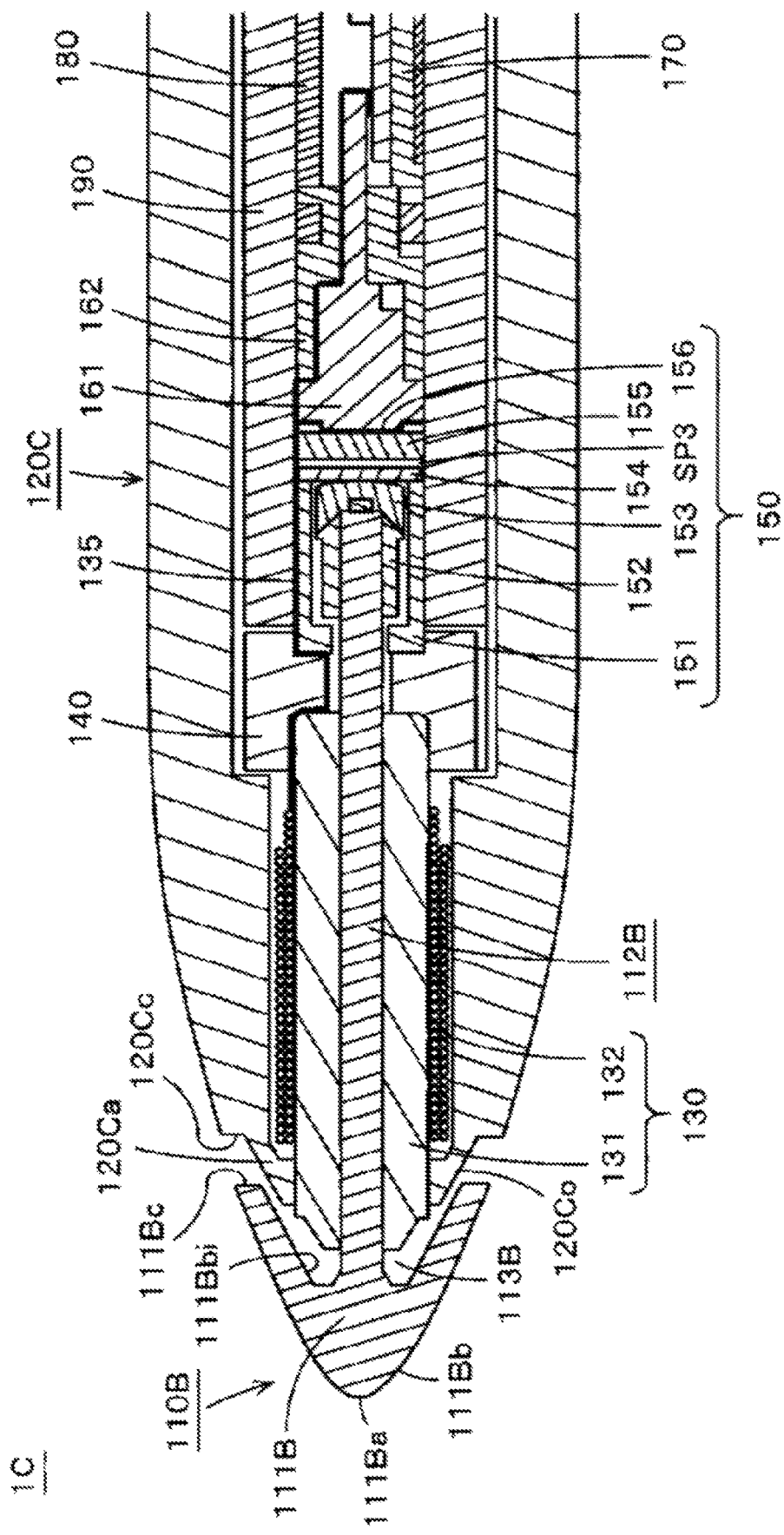
FIG. 7 is a cross-sectional view of a modification of the electronic pen.

FIG. 7 is an explanatory cross-sectional view of an electronic pen 1C which is a modification of the electronic pen 1. In FIG. 7, components having the same configurations as those in the electronic pen 1 having been described with use of FIGS. 2A, 2B, 3A, and 3B, are denoted by the same reference numerals, and a detailed description thereof will be omitted. In the electronic pen 1C of this modification, neither the outer tubular portion 121 nor the inner tubular portion 122 is provided on the end side of a casing 120C, and further, neither the fitting section 111d nor the fitting section 111x is provided to the core body 110B.

That is, the core body 110B of this modification has a tapered shape tapered toward a tip 111Ba, and the tip 111Ba has a rounded triangular pyramid (cone) shape, as illustrated in FIG. 7. A tip portion 111B of the core body 110B has a recessed section 113B which is recessed from the side (bottom surface side) opposite to the tip 111Ba toward the tip 111Ba side. A core rod 112B of the core body 110B passes through the center axis of the recessed section 113B included in the tip portion 111B, from the tip 111Ba side of the tip portion 111B, and extends in a direction away from the tip 111Ba, as illustrated in FIG. 7.

An end of a side surface 111Bb of the core body 110B has a ring-shaped end surface 111Bc as an end surface in a direction intersecting the axis. Thus, the core body 110B illustrated in FIG. 7 does not include the fitting section 111d, which is included in the core body 110 of the aforementioned electronic pen 1 and 1A, or the fitting section 111x, which is included in the electronic pen 1B.

Meanwhile, the casing 120C of the electronic pen 1C of this modification has a tubular shape, and has, at an end side thereof, an end surface 120Cc extending in a direction intersecting the axis. A ring-shaped projection 120Ca is provided so as to be tapered toward the end side (core body 110B side) from the end surface 120Cc. The end side of the projection 120Ca is an opening section, and an end of the ferrite core 131 of the coil portion 130 is projected therefrom, as illustrated in FIG. 7.

The core rod 112B of the core body 110B is inserted into the through hole in the ferrite core 131 projected from the end of the casing 120C, as illustrated in FIG. 7, whereby the core body 110B is attached to the casing 120C. In this case, the projection 120Ca of the casing 120C and the end portion of the ferrite core 131 are inserted in the recessed section 113B of the core body 110B. In this state, an inner surface (recessed section 113B-side surface) 111Bbi of the side surface 111Bb of the core body 110B is opposed to the end of the ferrite core 131 and an outer wall surface 120Co of the projection 120Ca. At the same time, the end surface 111Bc of the core body 110B is opposed to the end surface 120Cc of the casing 120C.

It is assumed that, in the electronic pen 1C of this modification having the above configuration, the pen pressure f is applied to the side surface 111Bb of the tip portion 111B of the core body 110B attached to the casing 120C, as indicated by the arrow in FIG. 2A. In this case, the component fa in the direction intersecting the axis of the electronic pen 1C is inhibited by a portion where the projection 120Ca of the casing 120C and the side surface 111Bb of the core body 110B overlap. Accordingly, the core rod 112B of the core body 110B is not warped in a direction intersecting the axis of the electronic pen 1C.

Meanwhile, the component fb, of the pen pressure f applied to the side surface 111Bb of the core body 110B, in the axis direction directly acts on the core body 110B. Therefore, as a whole, the pen pressure f applied to the side surface 111Bb of the tip portion 111B is efficiently transferred to the core rod 112B, so that the core body 110B is allowed to be slidably moved (pushed down/up) in the axis direction.

Accordingly, also in the case of the electronic pen 1C of the modification illustrated in FIG. 7, when the pen pressure is applied to the side surface 111Bb of the tip portion 111B of the core body 110B, the core rod 112B of the core body 110B presses the pen-pressure detector 150, so that the pen pressure can be appropriately detected. When the indicated position and the pen pressure can be detected, the indication can be inputted to the tablet-type information terminal 2. Consequently, also with the electronic pen 1C illustrated in FIG. 7, an indication for applying shading as if a pencil is used while being laid down, can be inputted to the tablet-type information terminal 2.

In the electronic pen 1C of the modification illustrated in FIG. 7, the distance from the end surface 111Bc of the side surface 111Bb of the tip portion 111B of the core body 110B to the end surface 120Cc of the casing 120C is set so as to be relatively large. However, this distance may be made short. Simply, it is only required to set the length of the side surface 111Bb of the tip portion 111B to be long. Thus, an area where the inner surface 111Bbi of the side surface 111Bb of the tip portion 111B is opposed to the outer wall surface 120Co of the projection 120Ca of the casing 120C becomes large. Therefore, in the state where the pen pressure f is applied to the side surface 111Bb of the tip portion 111B of the core body 110B, the component fa in the direction intersecting with the axis of the electronic pen 1C can be more reliably inhibited. Accordingly, the length of the side surface 111Bb of the tip portion 111B of the core body 110B and the length, in a direction toward the end side, of the projection 120Ca of the casing 120C can be set, as appropriate.

Second Embodiment

[Application to Active Capacitive Coupling Type Electronic Pen 3]

The electronic pen 1 according to the aforementioned first embodiment is an electromagnetic induction type. As a result of transmission and reception of signals between the position detection device 200 and the resonance circuit of the electronic pen 1, a position indication and reporting of a pen pressure are performed from the electronic pen 1 to the position detection device 200. However, the present disclosure is not limited to an electromagnetic induction type electronic pen. The present disclosure is applicable to an active capacitive coupling type electronic pen in which a position indication and reporting of a pen pressure are performed through transmission of a signal from an oscillation circuit installed in the electronic pen to a position detection device.

Figure 8:
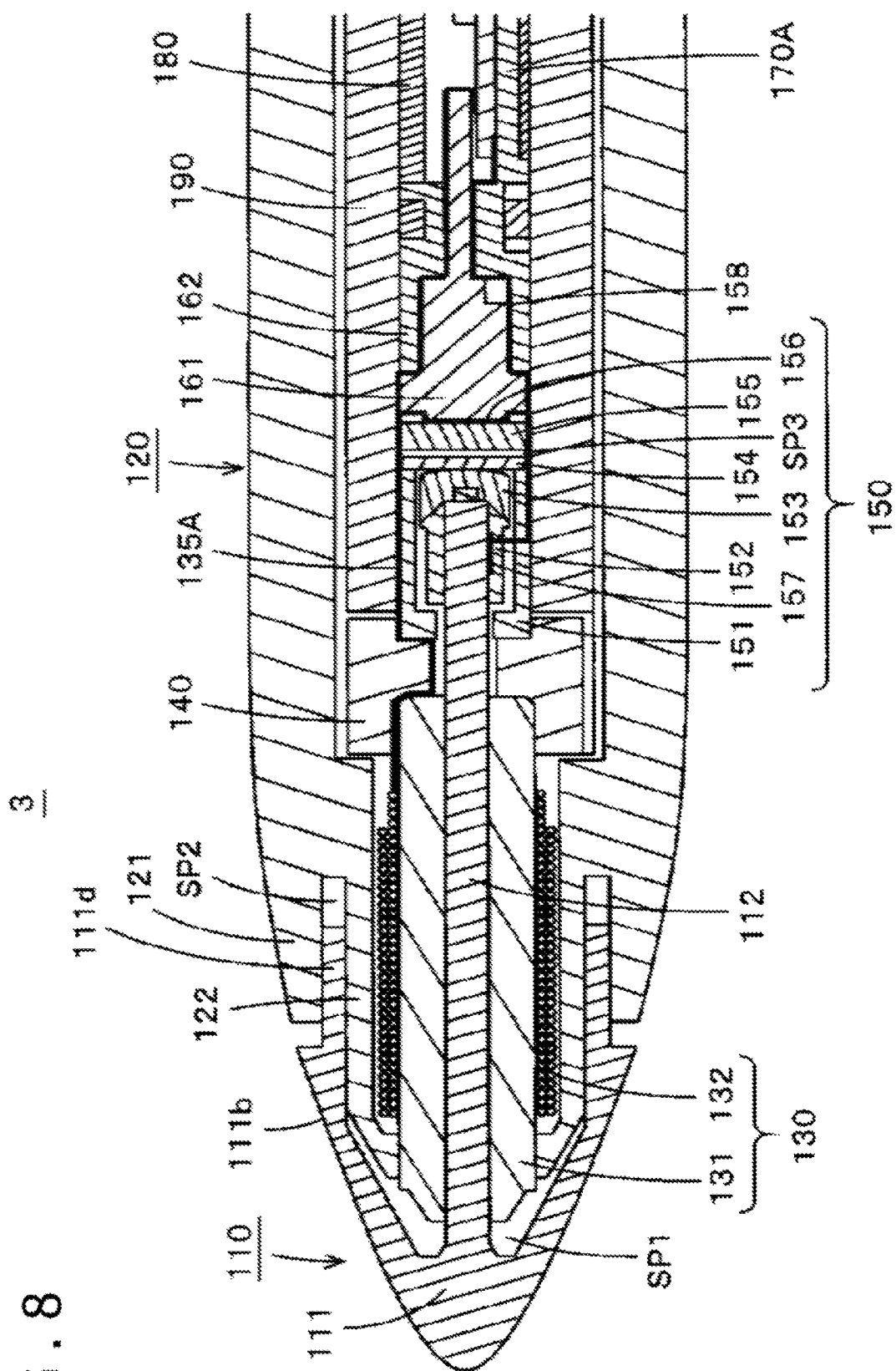
FIG. 8 is a cross-sectional view of an active capacitive coupling type electronic pen according to a second embodiment.

FIG. 8 is an explanatory diagram of an active capacitive coupling type electronic pen 3 to which the present disclosure has been applied, and is a cross-sectional view of the electronic pen 3. In FIG. 8, components having the same configurations as those in the electronic pen 1 having been described with use of FIGS. 2A, 2B, 3A, and 3B, are denoted by the same reference numerals, and a detailed description thereof will be omitted. Note that the core body 110 and the casing 120 each have the same configuration as those of the electronic pen 1 having been described with use of FIGS. 2A, 2B, 3A, and 3B. However, the core body 110 is formed by using a conductive material as the material thereof. The reason for this is that, in the active capacitive coupling type electronic pen 3, a signal is transmitted through the core body 110.

On a circuit board 170A of the electronic pen 3 according to the second embodiment, an oscillation circuit, a voltage conversion circuit, or the like are mounted to form an electronic circuit. Further, a battery for supplying power to the electronic circuit formed on the circuit board 170A is mounted on the circuit board 170A side. In the electronic pen 3, the coil 132 does not constitute the resonance circuit for transmitting and receiving signals. The coil 132 of the electronic pen 3 is connected, via a conductive wire 135A, to the battery (not illustrated) provided on the circuit board 170A side, and is used for charging the battery by generating current upon receiving the action of an AC magnetic field from a non-contact charger. In other words, in the electronic pen 3 according to the second embodiment, the coil 132 is provided for charging the battery.

Further, the conductive rubber 154 and the electrode 156 of the pen-pressure detector 150 are connected to the oscillation circuit mounted on the circuit board 170A. Accordingly, the oscillation circuit can generate a signal that varies according to the pen pressure detected as a change of the capacitance in the pen-pressure detector 150. Moreover, as illustrated in FIG. 8, a terminal 157 is provided on an inner side surface of the holding member 152 of the pen-pressure detector 150. The terminal 157 is connected to the oscillation circuit mounted on the circuit board 170A via the conductive line 158, thereby being able to transmit a signal from the oscillation circuit through the core body 110.

As described above, the core body 110 and the casing 120 of the electronic pen 3 according to the second embodiment have the same configurations as those of the electronic pen 1 according to the first embodiment having been described with use of FIGS. 2A, 2B, 3A, and 3B. Further, a pen-pressure detection mechanism of the electronic pen 3 for the pen pressure applied to the core body 110 is also the same as that of the electronic pen 1. It is assumed that the pen pressure f is applied to the side surface 111b of the tip portion 111 of the core body 110, as illustrated in FIG. 2A. In this case, the component fa in a direction intersecting the axis direction is inhibited by a three-layer structure in which the inner tubular portion 122 of the casing 120, the fitting section 111d of the core body 110, and the outer tubular portion 121 of the casing 120 are layered in a direction intersecting the axis direction. Accordingly, the core rod 112 of the core body 110 is not warped in a direction intersecting the axis of the electronic pen 1A. Meanwhile, the component fb in the axis direction appropriately acts on the core body 110. Consequently, as a whole, the pen pressure f applied to the side surface 111b of the tip portion 111 is efficiently transferred to the core rod 112 so as to appropriately slidingly move the core body 110 in the axis direction.

Accordingly, the core rod 112 of the core body 110 appropriately presses the pen-pressure detector 150 according to the pen pressure applied to the side surface 111b of the tip portion 111 of the core body 110 so that the pen pressure applied to the side surface 111b can also be appropriately detected. When the indicated position and the pen pressure can be detected, the indication can be inputted to a capacitive coupling type tablet information terminal. Consequently, with the electronic pen 3, an indication for applying shading as if a pencil is used while being laid down, can be inputted.

[Capacitive Coupling Type Electronic Pen 3 and Circuit Configuration Example of Position Detection Device 700]

Figure 9:
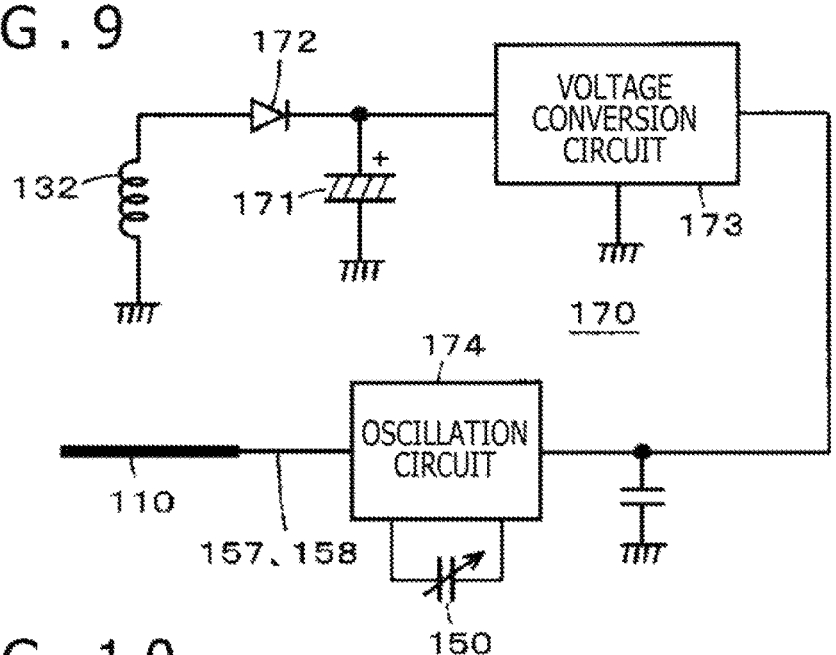
FIG. 9 is a circuit configuration diagram of the electronic pen according to the second embodiment.

FIG. 9 is a circuit configuration diagram of the electronic pen 3 according to the second embodiment. Throughout FIGS. 8 and 9, the same components are denoted by the same reference numerals. In FIG. 9, a reference numeral 171 denotes an electric double layer capacitor, a reference numeral 172 denotes a rectifying diode, a reference numeral 173 denotes a voltage conversion circuit, and a reference numeral 174 denotes an oscillation circuit. These components are connected in a manner which will be described later to form the electronic circuit on the circuit board 170A. More specifically, in this embodiment, one end of the coil 132 is connected to an anode of the diode 172, and the other end is grounded (GND), as illustrated in FIG. 9. Further, one end of the electric double layer capacitor 171 is connected to a cathode of the diode 172, and the other end is grounded.

The core body 110 constituting an electrode core is electrically connected to the oscillation circuit 174 via the terminal 157 and the conductive line 158. As described above, the pen-pressure detector 150 provided in the casing 120 of the electronic pen 3 is also electrically connected to the oscillation circuit 174.

The oscillation circuit 174 generates a signal the frequency of which varies according to the capacity of the variable capacitor of the pen-pressure detector 150, and supplies the generated signal to the core body 110. The signal from the oscillation circuit 174 is radiated, in a form of an electric field based on the signal, from the tip portion 111 of the core body 110. The oscillation circuit 174 is formed of an LC oscillation circuit using the resonance of a coil and a capacitor, for example. The position detection device that detects a coordinate position indicated by the electronic pen 3 according to the second embodiment, can obtain the pen pressure applied to the core body 110 on the basis of the frequency of the signal.

The voltage conversion circuit 173 converts the voltage stored in the electric double layer capacitor 171 to constant voltage, and supplies the voltage as a power supply for the oscillation circuit 174. When the capacitive coupling type electronic pen 3 according to the second embodiment is attached to a charger (not illustrated), an induced electromotive force is generated at the coil 132 by an alternating magnetic field generated by the charger. The induced electromotive force charges the electric double layer capacitor 171 via the diode 172. In other words, the electric double layer capacitor 171 corresponds to the aforementioned battery.

Thus, the capacitive coupling type electronic pen 3 according to the second embodiment can indicate a position to the position detection device and report the pen pressure to the position detection device, by transmitting the signal from the oscillation circuit 174 through the core body 110.

Figure 10:
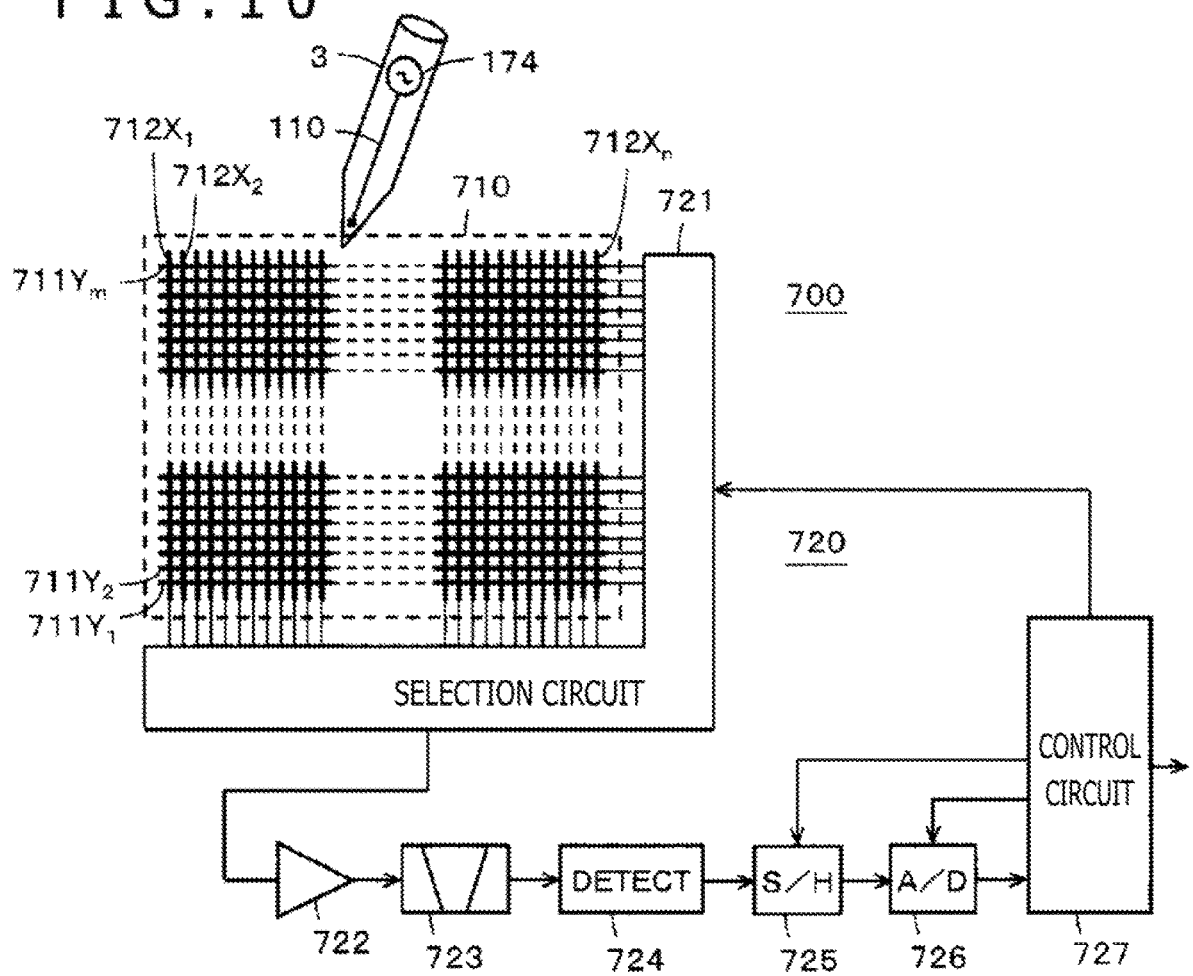
FIG. 10 is an explanatory block diagram of a capacitive coupling type position detection device according to the second embodiment.

FIG. 10 is an explanatory block diagram of a position detection device 700 that detects a position on a sensor and detects a pen pressure by receiving a signal from the capacitive coupling type electronic pen 3 according to the second embodiment having been described with use of FIGS. 8 and 9. In a capacitive coupling type tablet information terminal, the capacitive coupling type position detection device 700 is installed in place of the electromagnetic induction type position detection device 200.

The capacitive coupling type position detection device 700 according to the second embodiment includes a sensor 710 and a pen detection circuit 720 connected to the sensor 710, as illustrated in FIG. 10. The sensor 710 is formed by layering a first conductive body group 711 and a second conductive body group 712. The first conductive body group 711 is formed by parallelly arranging, at a predetermined interval therebetween in the Y-axis direction, a plurality of first conductive bodies extending in a lateral direction (X-axis direction), for example. The second conductive body group 712 is formed by parallelly arranging, at a predetermined interval therebetween in the X-axis direction, a plurality of second conductive bodies extending in an intersection direction relative to the first conductive bodies, or the longitudinal direction (Y-axis direction) orthogonal to the first conductive bodies in this embodiment. Thus, the sensor 710 of the position detection device 700 is configured to detect the position indicated by the capacitive type electronic pen 3, by using the sensor pattern which is formed by intersecting the first conductive body group 711 with the second conductive body group 712.

The pen detection circuit 720 includes a selection circuit 721 serving as an input/output interface relative to the sensor 710, an amplification circuit 722, a bandpass filter 723, a detection circuit 724, a sample hold circuit 725, an AD (analog to digital) conversion circuit 726, and a control circuit 727.

The selection circuit 721 selects, from among the first conductive body group 711 and the second conductive body group 712, one conductive body 711Y or 712X on the basis of a control signal from the control circuit 727. The conductive body selected by the selection circuit 721 is connected to the amplification circuit 722, so that a signal from the capacitive coupling type electronic pen 3 is detected by the selected conductive body, and is amplified by the amplification circuit 722. The output of the amplification circuit 722 is supplied to the bandpass filter 723, and only a component of the frequency of the signal transmitted from the capacitive coupling type electronic pen 3 is extracted.

An output signal from the bandpass filter 723 is detected by the detection circuit 724. The output signal of the detection circuit 724 is supplied to the sample hold circuit 725, is sampled and held at a predetermined timing on the basis of a sampling signal from the control circuit 727, and then, is converted into a digital value by the AD conversion circuit 726. The digital data from the AD conversion circuit 726 is read and processed by the control circuit 727.

The control circuit 727 operates, in accordance with a program stored in an inner ROM, to transmit control signals to the sample hold circuit 725, the AD conversion circuit 726, and the selection circuit 721. The control circuit 727 calculates the coordinates of the position on the sensor 710 indicated by the capacitive coupling type electronic pen 3, on the basis of digital data from the AD conversion circuit 726, and calculates the pen pressure detected by the pen-pressure detector 150.

As described above, the electronic pen 3 according to the second embodiment includes the core body 110 having the tip portion 111 the external appearance of which has a triangular pyramid shape, and includes the casing 120 which is connected to the core body 110. Accordingly, even when the electronic pen 3 is greatly tilted to apply the pen pressure to the side surface 111b of the tip portion 111 of the core body 110, the pen pressure can be appropriately detected. In other words, even when the pen pressure is applied to the side surface 111b of the tip portion 111 of the core body 110, the indicated position and the pen pressure can be appropriately reported from the electronic pen 3 to the position detection device 700.

Accordingly, with the capacitive coupling type electronic pen 3 according to the second embodiment, an electronic image can be drawn on the tablet-type information terminal by the same touch (quality) as that of an image drawn on a paper sheet with a pencil. Consequently, also when the capacitive coupling type electronic pen 3 according to the second embodiment is used, the variation of an indication input can be increased and the diversity of expression can be enlarged.

The modifications having been described with use of FIGS. 5A to 7 can also be applied to the capacitive coupling type electronic pen 3 according to the second embodiment. Further, any one of the modifications having been described with use of FIGS. 5A to 7 is applied to the electronic pen 3, the same effects provided by the electronic pen 3 having been described with use of FIG. 8 can be obtained.

The electronic pen 3 having been described with reference to FIGS. 7 and 8 includes the coil 132 for charging. However, this is not limited. For example, a contact terminal for charging may be provided in place of the coil 132 so as to charge the electric double layer capacitor 171. Alternatively, when an exchangeable cell is used as a battery, neither the coil 132 nor a charging terminal needs to be provided.

[Examples of Forming Core Body 110 and Material Thereof]

The core body 110 of the electromagnetic induction type electronic pen 1 according to the aforementioned first embodiment can be molded such that the tip portion 111 and the core rod are integrated by use of a single material such as an elastomer which is an industrial material having rubber elasticity, one of various synthetic resins including reinforced plastics, or ceramic. Also, the core body 110 of the capacitive coupling type electronic pen 3 according to the aforementioned second embodiment can be molded such that the tip portion 111 and the core rod are integrated by use of a single conductive material such as a synthetic resin (carbon resin) obtained by mixing various metals and a carbon material, for example. Also in the tip portion 111A of the modification illustrated in FIG. 6A, integral molding may be performed by use of the aforementioned material.

Figure 11A:
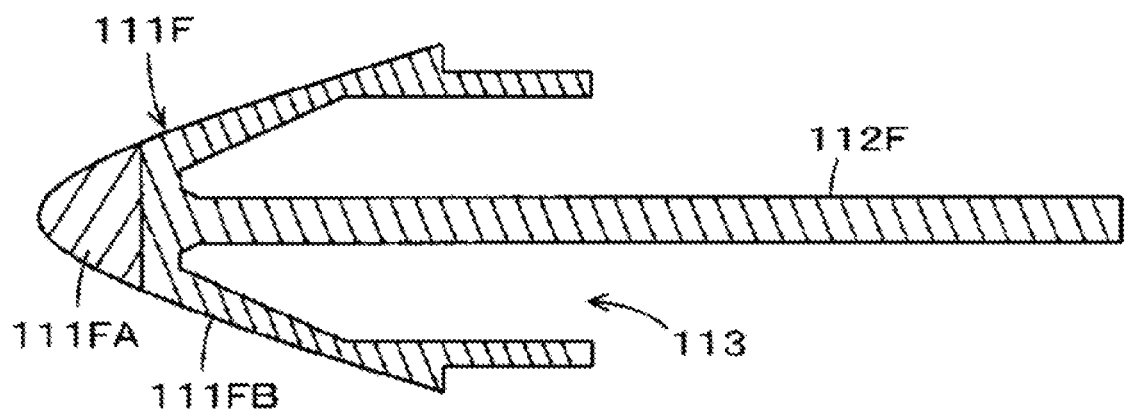
FIGS. 11A to 11C are explanatory diagrams of examples of forming a core body.
Figure 11B:
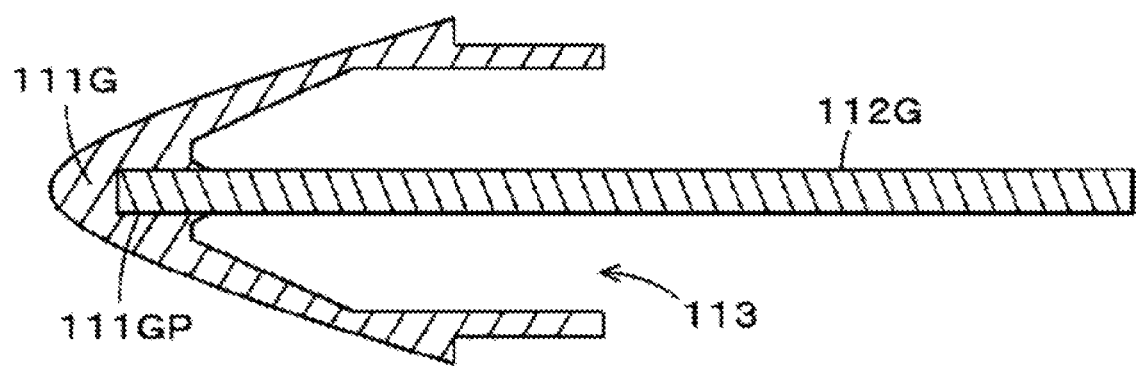
Figure 11C:
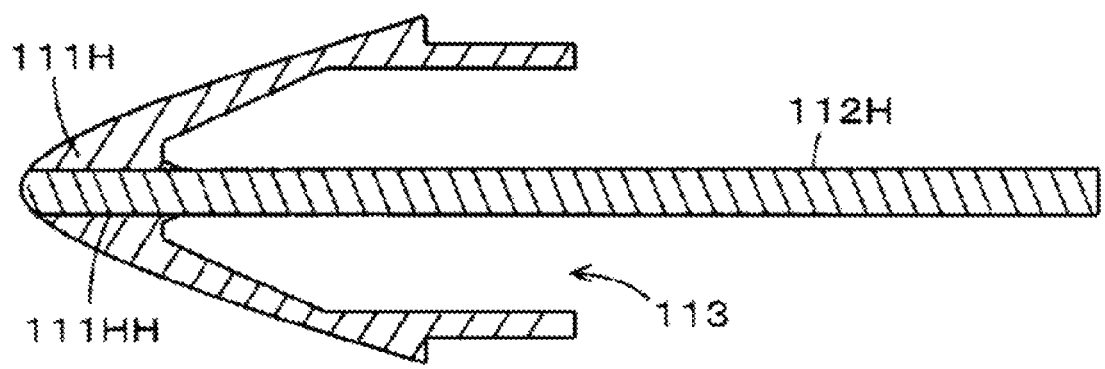

Moreover, the core body 110 can be formed in various forms. FIGS. 11A to 11C are explanatory diagrams of examples of forming the core body 110. FIG. 11A depicts an example in which the core body 110 is formed by two-color molding (double molding) in which different materials (different quality materials) are combined to be integrally molded. A tip portion 111F of this example includes a vertex section 111FA and a side surface section 111FB. The vertex section 111FA and the side surface section 111FB are formed from different materials. In this example, the side surface section 111FB and a core rod 112F are integrally formed from the same material.

As illustrated in FIG. 11A, the vertex section 111FA, the side surface section 111FB, and the core rod 112F are integrally formed by two-color molding. As a result, the vertex section 111FA which is frequently used for a minute input of a character or the like, for example, can have a certain level of elasticity, and can be formed by use of a slippery material that is unlikely to provide friction, while the side surface section 111FB can be formed by use of a material having relatively high hardness.

FIG. 11B depicts an example in which a fitting hole 111GP is provided in the bottom surface of the recessed section 113 of a tip portion 111G, a core rod 112G is inserted (fitted) into the fitting hole 111GP so as to be fixed, whereby the core body 110 is formed. In this case, the tip portion 111G and the core rod 112G may be bonded together with an adhesive material. Note that the tip portion 111G and the core rod 112G may be formed from the same material, or may be formed from different materials.

FIG. 11C depicts an example in which a through hole 111HH extending from the bottom surface of the recessed section 113 of a tip portion 111H to the tip of the tip portion 111H is provided, and a core rod 112H is inserted (fitted) in the through hole 111HH so as to be fixed, whereby the core body 110 is formed. In this case, the core rod 112H is projected from the tip portion 111H so as to form the tip. Also, the tip portion 111H and the core rod 112H may be bonded together with an adhesive material. The tip portion 111H and the core rod 112H may be formed from the same material or may be formed by use of different materials.

As a result, for example, the vertex section 111FA and the tip portion 111G and 111H can be each formed from a non-conductive material such as an elastomer, a synthetic resin, or ceramic, while the side surface section 111FB, the core rod 112F, and the core rod 112G or 112H can be each formed from a conductive material such as metal or a carbon resin. As a matter of course, all the vertex section 111FA, the tip portion 111G or 111H, the side surface section 111FB, the core rod 112F, and the core rod 112G or 112H may be formed from a non-conductive material or may be formed from a conductive material.

Even when all the vertex section 111FA, the tip portion 111G or 111H, the side surface section 111FB, the core rod 112F, and the core rod 112G or 112H are formed from the same material, these sections may be separately formed without being integrally molded, and be connected with one another to form the core body 110.

In FIG. 11B or 11C, when the tip portion 111G or 111H is a synthetic resin while the core rod 112G or 112H is metal, the core body 110 may be formed by so-called insert molding. In this case, the metal core rod 112G or 112H is put into a resin molding mold for the tip portion 111G or 111H, a resin is poured into the molding mold, and then, the molten resin is solidified after surrounding the core rod 112G or 112H, so that the core body 110 having a resin and a core rod integrated with each other can be formed. Each of the examples of forming the core body 110 described with use of FIGS. 11A to 11C is one example. The core body 110 may be formed by other various methods.

[Effects Provided by Embodiments]

According to the electronic pen of any one of the aforementioned embodiments, an electronic pen can be implemented which, when being used while being tilted so as to be substantially horizontal, can input an indication in a mode of filling in or shading a wide area as if a pencil is used while being tilted so as to be substantially horizontal.

It is to be noted that the embodiment of the present disclosure is not limited to the foregoing embodiment, and that various changes can be made without departing from the spirit of the present disclosure.

What is claimed is:

1. An electronic pen comprising:
 a core body including a tip portion having a tip, and a core rod extending from the tip portion in an axis direction of the core body,
 wherein:
  the tip portion includes a tapered side surface that is tapered toward the tip, a tubular fitting section extending in the axis direction of the core body, and a recessed section that is recessed toward a side of the core body that includes the tip from a side of the core body that is opposite to the side of the core body that includes the tip;
  the core rod passes through a center of the recessed section; and
  the tubular fitting section of the tip portion and the core rod are integrally formed from a same material; and
 a tubular casing in which a pen-pressure detector is installed, the core body being attached to the tubular casing in an axially movable manner such that the core rod of the core body is pressable against the pen-pressure detector, and the tubular casing having a surface that is adjacent to an inner or outer surface of the recessed section of the core body,
 wherein:
  the tubular casing includes an outer tubular portion, an inner tubular portion, and a fitting groove between the outer tubular portion and the inner tubular portion, the tubular casing includes a surface at an end of the fitting groove, the surface at the end of the fitting groove extending from the outer tubular portion to the inner tubular portion, an end of the tubular fitting section of the tip portion of the core body in the axis direction includes an end surface, the tubular fitting section of the tip portion of the core body is at least partially disposed in the fitting groove of the tubular casing with the end surface of the tubular fitting section opposite the surface at the end of the fitting groove, and a space is provided between the end surface of the tubular fitting section of the tip portion of the core body and the surface at the end of the fitting groove of the tubular casing, the space enabling the core body to move in the axis direction.

2. The electronic pen according to claim 1, wherein:
the casing includes a tubular portion having an opening formed at an end thereof, and
the core body is attached to the casing by fitting an inner wall surface of the tubular portion of the casing to an outer wall surface of the fitting section of the core body.

3. The electronic pen according to claim 2, wherein:
in a state in which the core body is attached to the casing, the outer wall surface of the fitting section of the core body and the inner wall surface of the tubular portion of the casing are parallel.

4. The electronic pen according to claim 1, wherein:
the casing includes a tubular portion having an opening formed at an end thereof, and
the core body is attached to the casing by fitting an outer wall surface of the tubular portion of the casing to an inner wall surface of the fitting section of the core body.

5. The electronic pen according to claim 4, wherein:
in a state in which the core body is attached to the casing, the inner wall surface of the fitting section of the core body and the outer wall surface of the tubular portion of the casing are parallel.

6. The electronic pen according to claim 1, wherein:
an outer tubular portion and an inner tubular portion are formed, at an end side of the casing, so as to be concentric about an axis with a predetermined distance therebetween in a direction intersecting the axis, and the casing has a fitting groove formed between the outer tubular portion and the inner tubular portion, and
the core body is attached to the casing by fitting the fitting section of the core body into the fitting groove of the casing.

7. The electronic pen according to claim 6, wherein:
in a state in which the core body is attached to the casing, the fitting section of the core body and the fitting groove of the casing are parallel to the axis.

8. The electronic pen according to claim 1, wherein:
a ferrite core having a through hole through which the core rod of the core body passes is provided in the casing such that an end of the ferrite core is projected from an opening in an end of the casing, and
in a state in which the core body is attached to the casing, the end of the ferrite core is positioned in the recessed section of the tip portion of the core body.

9. The electronic pen according to claim 1, wherein:
the core body is formed from a resin.

10. The electronic pen according to claim 1, wherein:
different materials are used for the tip portion and the core rod.

11. The electronic pen according to claim 1, wherein:
at least the tip portion of the core body is formed from an elastomer material.

12. The electronic pen according to claim 1, further comprising:
a resonance circuit, wherein, in operation:
a signal from an electromagnetic induction exchange type position detection sensor is received through the resonance circuit, and the signal received through the resonance circuit is used to transmit a signal to the electromagnetic induction exchange type position detection sensor through the resonance circuit, and information is inputted through the electromagnetic induction exchange type position detection sensor.

13. The electronic pen according to claim 1, wherein:
the electronic pen is of a capacitive coupling type,
the core body is formed from a conductive material,
an oscillation circuit is provided, and
in operation, a signal from the oscillation circuit is transmitted through the core body, and information is inputted through a position detection sensor of the capacitive coupling type.

* * * * *